US011909256B2

United States Patent
Hattori

(10) Patent No.: US 11,909,256 B2
(45) Date of Patent: Feb. 20, 2024

(54) SWITCHING MODULE AND POWER SUPPLY SYSTEM

(71) Applicant: Murata Manufacturing Co., Ltd., Nagaokakyo (JP)

(72) Inventor: Kazuo Hattori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 113 days.

(21) Appl. No.: 17/847,354

(22) Filed: Jun. 23, 2022

(65) Prior Publication Data

US 2022/0320893 A1 Oct. 6, 2022

Related U.S. Application Data

(63) Continuation of application No. PCT/JP2020/046011, filed on Dec. 10, 2020.

(30) Foreign Application Priority Data

Dec. 25, 2019 (JP) ................................. 2019-234817

(51) Int. Cl.
*H02M 1/32* (2007.01)
*H02M 7/06* (2006.01)
*H02J 9/06* (2006.01)

(52) U.S. Cl.
CPC ............... *H02J 9/061* (2013.01); *H02M 1/32* (2013.01); *H02M 7/06* (2013.01)

(58) Field of Classification Search
CPC ............ H02J 9/061; H02M 1/32; H02M 7/06; H02M 1/0012; H02M 1/007; H02M 1/10; H02M 3/156; H01H 47/00
See application file for complete search history.

(56) References Cited

U.S. PATENT DOCUMENTS

2010/0181829 A1* 7/2010 Ichikawa ............ H01M 10/425
 307/9.1
2012/0065827 A1* 3/2012 Kimura ................. B60L 58/18
 903/903

(Continued)

FOREIGN PATENT DOCUMENTS

| JP | H0543731 U | 6/1993 |
| JP | 2018198478 A | 12/2018 |
| WO | 2018043319 A1 | 3/2018 |

OTHER PUBLICATIONS

International Search Report in PCT/JP2020/046011, dated Mar. 2, 2021, 3 pages.

(Continued)

*Primary Examiner* — Lincoln D Donovan
*Assistant Examiner* — Alex W Lam
(74) *Attorney, Agent, or Firm* — Keating & Bennett, LLP

(57) ABSTRACT

A switching module includes mechanical relays, semiconductor switches, voltage detectors to detect an input voltage to a power converter, and a controller. When the controller determines that the waveform of the input voltage is abnormal during a first determination period, the controller outputs an open command signal to mechanical relays corresponding to a power source electrically coupled to the power converter. When the controller subsequently determines that the waveform of the input voltage is normal during a second determination period, the controller outputs a close command signal to the mechanical relays.

18 Claims, 16 Drawing Sheets

(56) References Cited

U.S. PATENT DOCUMENTS

2018/0342893 A1* 11/2018 Yamada ................ H02M 7/162
2019/0181773 A1* 6/2019 Kawai ...................... H02J 3/38

OTHER PUBLICATIONS

Written Opinion in PCT/JP2020/046011, dated Mar. 2, 2021, 3 pages.

* cited by examiner

SWITCHING MODULE AND POWER SUPPLY SYSTEM

CROSS REFERENCE TO RELATED APPLICATIONS

This application claims the benefit of priority to Japanese Patent Application No. 2019-234817 filed on Dec. 25, 2019 and is a Continuation Application of PCT Application No. PCT/JP2020/046011 filed on Dec. 10, 2020. The entire contents of each application are hereby incorporated herein by reference.

BACKGROUND OF THE INVENTION

1. Field of the Invention

The present invention relates to a switching module and a power supply system.

2. Description of the Related Art

Power supply systems have been developed that include a converter configured to convert an alternating-current voltage into a direct-current voltage and output the direct-current voltage to a load, a switch configured to electrically connect one of a plurality of alternating-current (AC) power sources to the converter, an input voltage detector configured to detect an input voltage inputted to the converter, an abnormality monitor configured to repeat, for a predetermined period, determining whether the AC power source is abnormal, based on the input voltage detected by the input voltage detector, and a switching controller configured to, when the abnormality monitor detects an abnormality, control the switch to connect another of the plurality of AC power supplies to the converter (refer to, for example, International Publication No. 2018/043319). Here, the switch includes mechanical relays respectively coupled to two AC power source. The switch switches among the AC power sources to establish electrical connection with the converter by changing the combination of the state of the two mechanical relays by turning on or off the individual mechanical relays.

With the configuration in which the mechanical relays are used to switch among AC power sources to establish electrical connection with a converter, such as the power supply system described in International Publication No. 2018/043319, the response time of the mechanical relay affects the time to switch among the AC power sources. More specifically, the time for switching is affected by the response time since a control signal is outputted to a mechanical relay until the mechanical relay actually becomes open or closed. Moreover, to determine whether the waveform of an alternating-current voltage outputted from an AC power source is normal or abnormal, the waveform of the alternating-current voltage needs to be monitored for some length of time for determination for the purpose of eliminating the effect of sudden noises. With the power supply system described in International Publication No. 2018/043319, the waveform of an alternating-current voltage is monitored for a preset length of determination time to determine normality or abnormality. When the abnormality of the waveform is detected, a control signal is outputted to the mechanical relays. Consequently, to switch among the AC power sources to establish electrical connection with the converter, it is necessary to take time equal to at least the determination time and the response time of the mechanical relays, thereby extending the time to switch among the AC power sources.

SUMMARY OF THE INVENTION

Preferred embodiments of the present invention provide switching modules and power supply systems that are each able to shorten the time required to switch among power sources defining electric power supplies.

A switching module according to a preferred embodiment of the present invention, which is configured to output to a subsequent circuit electric power supplied from one of a plurality of power sources, includes a plurality of mechanical relays coupled between the plurality of power sources and the subsequent circuit, a plurality of semiconductor switches respectively coupled in parallel with the plurality of mechanical relays, a voltage detector to detect an input voltage to the subsequent circuit, and a controller configured or programmed to control connection and disconnection of the plurality of mechanical relays to electrically couple one of the plurality of power sources to the subsequent circuit. The controller is configured or programmed to, when determining that the input voltage is abnormal during a preset first determination period, output an open command signal to open a closed mechanical relay of the plurality of mechanical relays to the closed mechanical relay, and control a semiconductor switch of the plurality of semiconductor switches coupled in parallel with the mechanical relay receiving the open command signal to drive the semiconductor switch into an ON state. The controller is further configured or programmed to, after the first determination period elapses, when determining that the input voltage is normal during a preset second determination period longer than the first determination period, output a close command signal to close the mechanical relay receiving the open command signal to the mechanical relay receiving the open command signal, and control the semiconductor switch coupled in parallel with the mechanical relay receiving the open command signal to drive the semiconductor switch into an ON state. The controller is further configured or programmed to, when determining that the input voltage is abnormal during the second determination period, control the semiconductor switch coupled in parallel with the mechanical relay receiving the open command signal to drive the semiconductor switch into an OFF state, and subsequently output the close command signal to an open mechanical relay different from the mechanical relay receiving the open command signal of the plurality of mechanical relays.

In a switching module according to a preferred embodiment of the present invention, the controller may be configured or programmed to, every time a preset determination time arrives, determine whether the input voltage is abnormal in accordance with an instantaneous value of the input voltage detected by the voltage detector during a third determination period shorter than the first determination period. The controller may also be configured or programmed to, when determining that the input voltage is abnormal during the third determination period, determine whether the input voltage is abnormal during the first determination period. The controller may also be configured or programmed to, when determining that the input voltage is normal during the third determination period, end determination whether the input voltage is abnormal.

In a switching module according to a preferred embodiment of the present invention, the controller may be configured or programmed to, when the instantaneous value of the input voltage is outside a preset reference range continuously for a preset reference period during the first determination period, determine that the input voltage is abnormal during the first determination period.

In a switching module according to a preferred embodiment of the present invention, the controller may be configured or programmed to, when the condition in which the determination result of the first determination period is different from the determination result of the second determination period is consecutively repeated a predetermined number of times, update the first determination period to a longer period.

A switching module according to a preferred embodiment of the present invention may include a temperature detector to detect a temperature of each of the plurality of semiconductor switches. The controller may be configured or programmed to, when the temperature of at least one of the plurality of semiconductor switches, detected by the temperature detector, exceeds a preset reference temperature, extend the first determination period by a preset unit period.

With a switching module according to a preferred embodiment of the present invention, each of the plurality of power sources may be a three-phase alternating current (AC) power source including three delta-connected AC power sources. The controller may be configured or programmed to, in the state in which one of the plurality of power sources is electrically coupled to the subsequent circuit via three power lines, obtain the instantaneous value by calculating, with respect to different pairs of two power lines selected from the three power lines, an effective value of a line voltage between two power lines of each pair.

A power supply system according to a preferred embodiment of the present invention includes a power converter to convert inputted electric power and supply the electric power to a load, and a switching module to output to the power converter electric power supplied from one of a plurality of power sources. The switching module includes a plurality of mechanical relays coupled between the plurality of power sources and the power converter, a plurality of semiconductor switches respectively coupled in parallel with the plurality of mechanical relays, a voltage detector to detect an input voltage to the power converter, and a controller configured or programmed to control connection and disconnection of the plurality of mechanical relays to electrically couple one of the plurality of power sources to the power converter. The controller is configured or programmed to, when determining that the input voltage is abnormal during a preset first determination period, output an open command signal to open a closed mechanical relay of the plurality of mechanical relays to the closed mechanical relay, and also control, of the plurality of semiconductor switches, a semiconductor switch coupled in parallel with the mechanical relay receiving the open command signal to drive the semiconductor switch into an ON state. The controller is further configured or programmed to, after the first determination period elapses, when determining that the input voltage is normal during a preset second determination period longer than the first determination period, output a close command signal to close the mechanical relay receiving the open command signal to the mechanical relay receiving the open command signal, and control the semiconductor switch coupled in parallel with the mechanical relay receiving the open command signal to drive the semiconductor switch into an ON state. The controller is further configured or programmed to, when determining that the input voltage is abnormal during the second determination period, control the semiconductor switch coupled in parallel with the mechanical relay receiving the open command signal to drive the semiconductor switch into an OFF state, and subsequently output the close command signal to an open mechanical relay different from the mechanical relay receiving the open command signal of the plurality of mechanical relays.

According to preferred embodiments of the present invention, when the controller determines that the waveform of the input voltage to the subsequent circuit is abnormal during a preset first determination period, the controller outputs an open command signal to open a closed mechanical relay of the plurality of mechanical relays to the closed mechanical relay. When the controller determines that the waveform of the input voltage is normal during a preset second determination period longer than the first determination period, the controller outputs an open command signal to close the mechanical relay receiving the open command signal to the mechanical relay receiving the close command signal, and also controls the semiconductor switch coupled in parallel with the mechanical relay receiving the open command signal to drive the semiconductor switch into an ON state. Conversely, when the controller determines that the input voltage is abnormal during the second determination period, the controller controls the semiconductor switch coupled in parallel with the mechanical relay receiving the open command signal to drive the semiconductor switch into an OFF state. The controller subsequently outputs the close command signal to an open mechanical relay different from the mechanical relay receiving the open command signal of the plurality of mechanical relays. With this configuration, for example, by setting the second determination period to a length long enough to accurately determine whether the waveform of the input voltage is abnormal, the occurrence of malfunction in the switching module can be reduced or prevented. Furthermore, when the waveform of the input voltage is abnormal, an open command signal is outputted to a closed mechanical relay when the first determination period shorter than the second determination period elapses, and thus, the operation of driving a closed mechanical relay into the open state can start earlier.

Consequently, when the waveform of the input voltage is abnormal, it is possible to reduce the time required to change the power sources as the power supply.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings. A switching module according to a preferred embodiment of the present invention is configured to output electric power supplied from, for example, any one of a plurality of three-phase alternating-current (AC) power sources to a subsequent circuit. The switching module includes a plurality of mechanical relays coupled between the plurality of power sources and the subsequent circuit, a voltage detector to detect an input voltage to the subsequent circuit, and a controller configured or programmed to control connection and disconnection of the plurality of mechanical relays to electrically couple one of the plurality of AC power sources to the subsequent circuit. When the controller determines that the waveform of the input voltage is abnormal during a preset first determination period, the controller outputs an open command signal to open a closed mechanical relay of the plurality of mechanical relays to the closed mechanical relay. When the controller subsequently determines that the waveform of the input voltage is normal during a preset second determination period longer than the first determination period, the controller outputs a close command signal to close the mechanical relay receiving the open command signal to the mechanical relay receiving the open command signal. When the controller determines that the waveform of the input voltage is abnormal during the second determination period, the controller outputs a close command signal to an open mechanical relay different from the mechanical relay receiving the open command signal of the plurality of mechanical relays, thus changing the power source coupled to the subsequent circuit.

Figure 1:
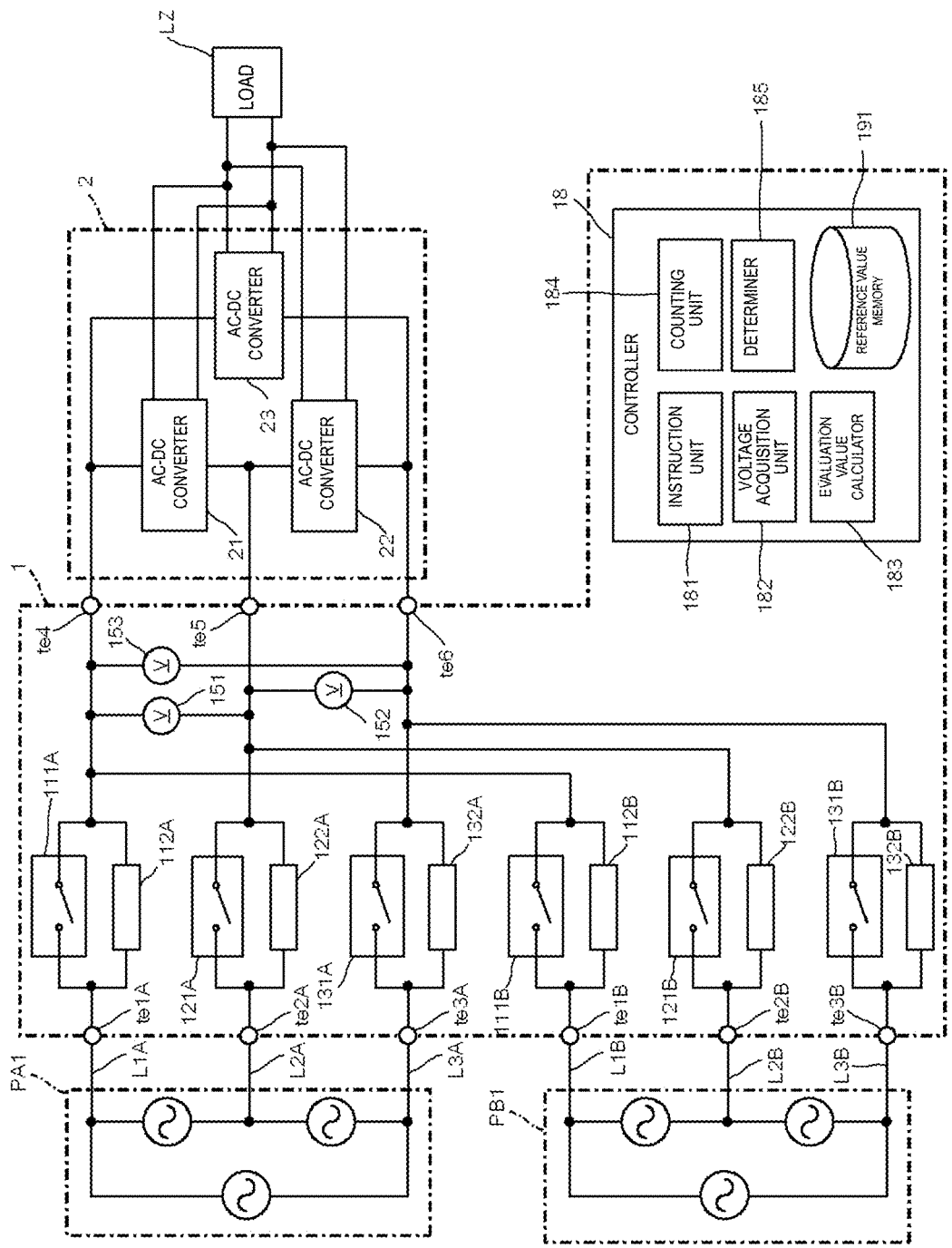
FIG. 1 schematically illustrates a configuration of a power supply system according to a preferred embodiment of the present invention.

The power supply system according to the present preferred embodiment is an uninterruptible power supply system to supply electric power to, for example, servers in a data center. For example, as illustrated in FIG. 1, the power supply system receives AC power from a power source PA1, which is a three-phase AC power source, or a power source PB1, which is a three-phase AC power source provided as a standby system, and supplies direct-current (DC) power to a load LZ, which may be a server (not illustrated in the drawing). The power source PA1 includes three delta-connected AC power sources. The power source PA1 supplies three-phase alternating currents through three power lines L1A, L2A, and L3A to the power supply system. The power source PB1 includes three delta-connected AC power sources. The power source PB1 supplies three-phase AC power through three power lines L1B, L2B, and L3B to the power supply system.

Figure 2:
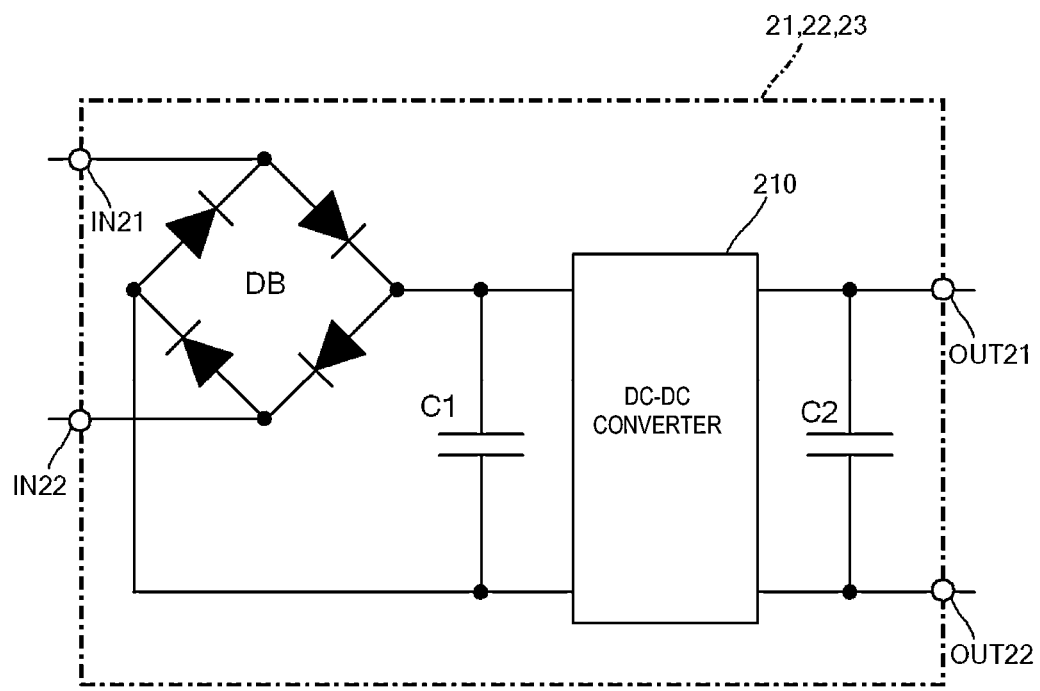
FIG. 2 is a circuit diagram of a power converter according to a preferred embodiment of the present invention.

The power supply system includes a switching module 1 and a power converter 2. The power converter 2 includes three AC-DC converters 21, 22, and 23. For example, as illustrated in FIG. 2, the AC-DC converters 21, 22, and 23 each include a rectifier circuit DB coupled between a pair of input ends IN21 and IN22, a capacitor C1 for smoothing, coupled between output ends of the rectifier circuit DB, a DC-DC converter 210 to step up or down a direct-current voltage between ends of the capacitor C1 and output the direct-current voltage, and a capacitor C2 for reducing ripple current, coupled between output ends of the DC-DC converter 210. The DC-DC converter 210 includes, for example, an inductor, a switching element, and a drive circuit to drive the switching element. The drive circuit outputs a pulse width modulation (PWM) or pulse frequency modulation (PFM) signal to the switching element in accordance with command value information indicating a command value of output voltage, inputted by a controller 18, thus controlling the DC-DC converter 210. A pair of output ends OUT21 and OUT22 of the DC-DC converter 210 are coupled to the load LZ.

Referring back to FIG. 1, the switching module 1 outputs AC power supplied by one of the two power sources PA1 and PB1 to the power converter 2. The switching module 1 includes, for example, six mechanical relays 111A, 121A, 131A, 111B, 121B, and 131B, six semiconductor switches 112A, 122A, 132A, 112B, 122B, and 132B, and three voltage detectors 151, 152, and 153, which are all coupled between the two power sources PA1 and PB1 and the power converter 2. The switching module 1 also includes, for example, six input terminals te1A, te2A, te3A, te1B, te2B, and te3B, and three output terminals te4, te5, and te6. The input terminals te1A, te2A, and te3A are respectively coupled to the power lines L1A, L2A, and L3A coupled to the three-phase power source PA1. The input terminals te1B, te2B, and te3B are respectively coupled to the power lines L1B, L2B, and L3B coupled to the three-phase power source PB1 as a standby system. Between the output terminals te4 and te5, the output terminals te5 and te6, and the output terminals te6 and te4, a pair of input ends (the input ends IN21 and IN22 in FIG. 2) of corresponding one of the AC-DC converters 21, 22, and 23 are coupled.

Figure 3:
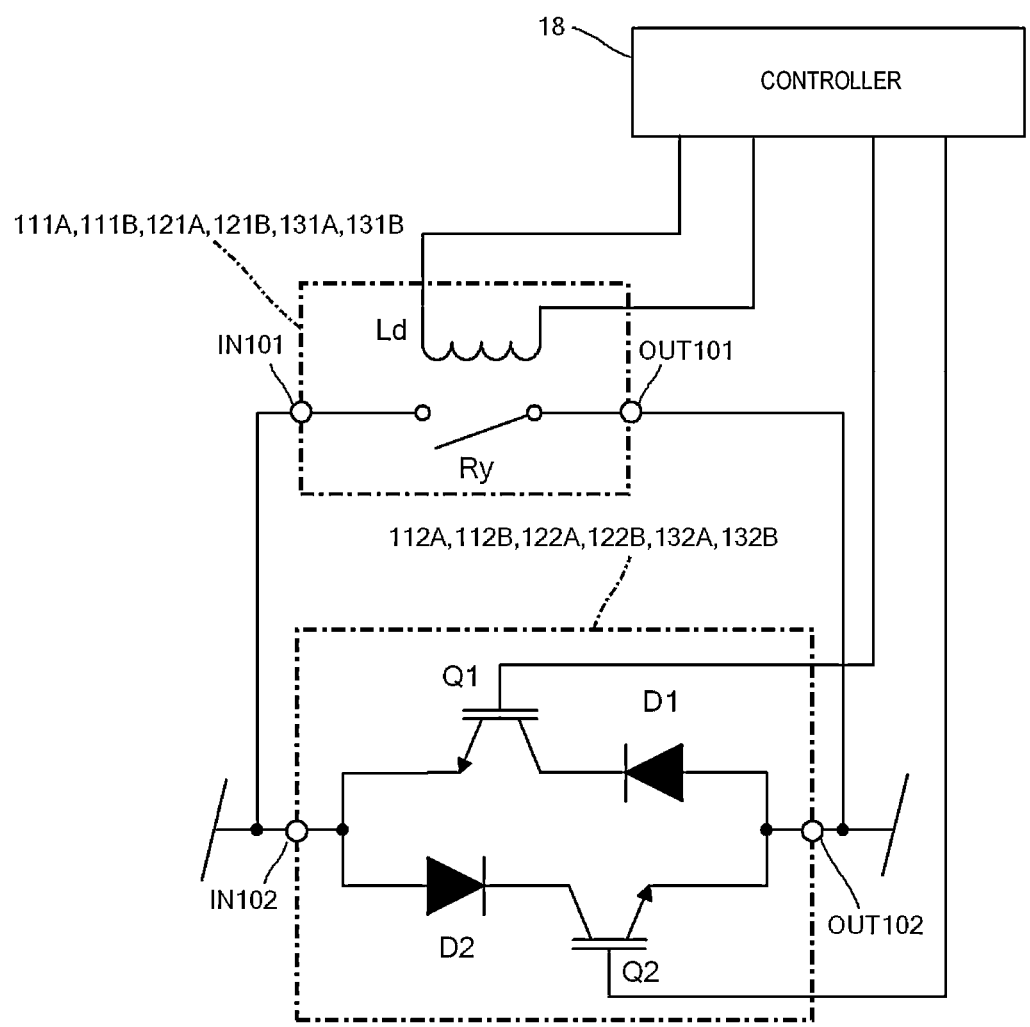
FIG. 3 is a circuit diagram illustrating a mechanical relay and a semiconductor switch according to a preferred embodiment of the present invention.

The mechanical relays 111A, 121A, and 131A are respectively coupled between the input terminals te1A, te2A, and te3A and the output terminals te4, te5, and te6. The mechanical relays 111B, 121B, and 131B are respectively coupled between the input terminals te1B, te2B, and te3B and the output terminals te4, te5, and te6. The mechanical relays 111A, 121A, 131A, 111B, 121B, and 131B each may be, for example, an electromagnetic relay as illustrated in FIG. 3. The electromagnetic relay includes an electromagnetic coil Ld and a contact switch Ry coupled between an input end IN101 and an output end OUT101. The contact switch Ry may be, for example, a normally open contact switch, in which a movable contact is disconnected from a stationary contact in a default state. When the controller 18 inputs a close command signal to the mechanical relay 111A, 121A, 131A, 111B, 121B, or 131B to close the relay, a current flows in the coil Ld, and the movable and stationary contacts of the contact switch Ry are brought into contact. As a result, the relay is closed. When the controller 18 inputs an open command signal to the mechanical relay 111A, 121A, 131A, 111B, 121B, or 131B to open the relay, the current flowing in the coil Ld is stopped, and the movable contact of the contact switch Ry is disconnected from the stationary contact. As a result, the relay is open. The mechanical relays 111A, 121A, 131A, 111B, 121B, and 131B each have a function of, while the movable contact of the contact switch Ry is in contact with the stationary contact, continuously outputting to the controller 18 a contact state notification signal to notify the controller 18 of the contact state.

Referring back to FIG. 1, the semiconductor switches 112A, 122A, and 132A are respectively coupled in parallel with the mechanical relays 111A, 121A, and 131A between the input terminals te1A, te2A, and te3A and the output terminals te4, te5, and te6. The semiconductor switches 112B, 122B, and 132B are respectively coupled in parallel with the mechanical relays 111B, 121B, and 131B between the input terminals te1B, te2B, and te3B and the output terminals te4, te5, and te6. The semiconductor switches 112A, 122A, 132A, 112B, 122B, and 132B each may be, for example, a bidirectional switch as illustrated in FIG. 3. The bidirectional switch includes two switching elements Q1 and Q2 and two diodes D1 and D2. The switching elements Q1 and Q2 may be, for example, insulated gate bipolar transistors (IGBTs). One end of the switching element Q1 is coupled to an input end IN102. The cathode of the diode D1 is coupled to the other end of the switching element Q1. The anode of the diode D1 is coupled to an output end OUT102. The anode of the diode D2 is coupled to the input end IN102. One end of the switching element Q2 is coupled to the cathode of the diode D2. The other end of the switching element Q2 is coupled to the output end OUT102. When the controller 18 inputs to the semiconductor switch 112A, 122A, 132A, 112B, 122B, or 132B an ON command signal to turn on the semiconductor switch, the switching elements Q1 and Q2 are driven into an ON state. Conversely, when the controller 18 inputs to the semiconductor switch 112A, 122A, 132A, 112B, 122B, or 132B an OFF command signal to turn off the semiconductor switch, the switching elements Q1 and Q2 are driven into an OFF state.

Referring back to FIG. 1, the voltage detectors 151, 152, and 153 individually detect an input voltage inputted to the power converter 2. The voltage detector 151, which is coupled between the output terminals te4 and te5, detects a voltage between the output terminals te4 and te5, that is, an input voltage to the AC-DC converter 21. The voltage detector 152, which is coupled between the output terminals te5 and te6, detects a voltage between the output terminals te5 and te6, that is, an input voltage to the AC-DC converter 22. The voltage detector 153, which is coupled between the output terminals te6 and te4, detects a voltage between the output terminals te6 and te4, that is, an input voltage to the AC-DC converter 23.

The controller 18 controls connection and disconnection of the six mechanical relays 111A, 121A, 131A, 111B, 121B, and 131B so as to electrically couple one of the two power sources PA1 and PB1 to the power converter 2. The controller 18 also controls ON state and OFF state of the semiconductor switches 112A, 122A, 132A, 112B, 122B, and 132B. The controller 18 includes, for example, a microcomputer and a memory. The microcomputer defines and functions as an instruction circuit 181, a voltage acquirer 182, an evaluation value calculator 183, a counter 184, and a determiner 185. The memory includes a reference value memory 191 to store a count threshold, and information indicating the length of a first determination period and information indicating the length of a second determination period. The count threshold is used in an abnormality determination operation described later to evaluate the count indicating how many times abnormality is discovered.

The instruction circuit 181 outputs a close command signal, which is used to close the mechanical relays 111A, 121A, 131A, 111B, 121B, and 131B, to the mechanical relays 111A, 121A, 131A, 111B, 121B, and 131B, thus closing the mechanical relays 111A, 121A, 131A, 111B, 121B, and 131B. The instruction circuit 181 outputs an open command signal, which is used to open the mechanical relays 111A, 121A, 131A, 111B, 121B, and 131B, to the mechanical relays 111A, 121A, 131A, 111B, 121B, and 131B, thus opening the mechanical relays. The instruction circuit 181 also outputs an ON command signal, which is used to drive the semiconductor switches 112A, 122A, 132A, 112B, 122B, and 132B into an ON state, to the semiconductor switches 112A, 122A, 132A, 112B, 122B, and 132B, thus driving the semiconductor switches into the ON state. The instruction circuit 181 also outputs an OFF command signal, which is used to drive the semiconductor switches 112A, 122A, 132A, 112B, 122B, and 132B into an OFF state, to the semiconductor switches 112A, 122A, 132A, 112B, 122B, and 132B, thus driving the semiconductor switches into the OFF state.

The voltage acquirer 182 acquires information indicating an instantaneous value of the input voltage inputted to the power converter 2 and detected by each of the voltage detectors 151, 152, and 153. The voltage acquirer 182 acquires the information indicating an instantaneous value of the input voltage inputted to the power converter 2 when a determination time arrives at preset time intervals. The time interval may be set to, for example, 125 μsec.

The evaluation value calculator 183 calculates, in accordance with the instantaneous value of the input voltage inputted to the power converter 2, an evaluation value to determine whether the waveform of the input voltage is abnormal. The evaluation value calculator 183 calculates the evaluation value by obtaining effective values of the line voltage between each pair of two power lines selected from three power lines (for example, the power lines L1A, L2A, and L3A) electrically connecting either one of the two power sources PA1 and PB1 to the power converter 2. Specifically, the evaluation value calculator 183 calculates the evaluation value, based on the sum of the square of an instantaneous value of the input voltage inputted to the power converter 2 and detected by each of the voltage detectors 151, 152, and 153.

The determiner 185 performs a pre-determination operation every time the determination time arrives. In the pre-determination operation, it is determined whether the waveform of an input voltage is abnormal in accordance with an instantaneous value of the input voltage inputted to the power converter 2 and detected by each of the voltage detectors 151, 152, and 153 during a preset third determination period. The length of the third determination period is, for example, about several μsec. The expression "an instantaneous value of an input voltage" denotes not only an actual instantaneous value of an input voltage but also an evaluation value calculated based on an instantaneous value of an input voltage. When the evaluation value calculated by the evaluation value calculator 183 is within a preset reference range, the determiner 185 determines that the waveform of the input voltage is normal. Conversely, when the evaluation value calculated by the evaluation value calculator 183 is outside the preset reference range, the determiner 185 determines that the waveform of the input voltage is abnormal. When it is determined that the waveform of the input voltage is normal in the preceding pre-determination operation, the determiner 185 repeats the pre-determination operation.

When it is determined that the waveform of the input voltage is abnormal in the preceding pre-determination operation, the determiner 185 determines whether the waveform of the input voltage is abnormal during the preset first determination period. The first determination period is set to, for example, a length long enough to determine that the waveform of the input voltage inputted to the power converter 2 can be abnormal. The first determination period may be set to, for example, about 1 msec. When the evaluation value is continuously outside the preset reference range for a preset first reference period during the first determination period, the determiner 185 determines that the waveform of the input voltage is abnormal during the first determination period. Specifically, the determiner 185 determines whether the evaluation value is within the reference range every time the determination time arrives during the first determination period. When a determined abnormality count during the first determination period, which indicates how many times the evaluation value is consecutively determined to be outside the reference range during the first determination period, is equal to or greater than a preset first determined abnormality count threshold, the determiner 185 determines that the waveform of the input voltage is abnormal. In contrast, the determined abnormality count during the first determination period is smaller than the first determined abnormality count threshold, the determiner 185 determines that the waveform of the input voltage is normal. When the determiner 185 determines that the waveform of the input voltage is normal during the first determination period, the determiner 185 again performs the pre-determination operation.

When it is determined that the waveform of the input voltage is abnormal during the first determination period, the determiner 185 determines whether the waveform of the input voltage is abnormal during the preset second determination period longer than the first determination period. The second determination period is set to, for example, a length long enough to accurately determine whether the waveform of the input voltage inputted to the power converter 2 is abnormal. The second determination period may be set to, for example, about 5 msec. When the evaluation value is continuously outside the reference range for a preset second reference period during the second determination period, the determiner 185 determines that the waveform of the input voltage is abnormal during the second determination period. Specifically, the determiner 185 determines whether the evaluation value is within the reference range every time the determination time arrives during the second determination period. When a determined abnormality count during the second determination period, which indicates how many times the evaluation value is successively determined to be outside the reference range during the second determination period, is equal to or greater than a preset second determined abnormality count threshold, the determiner 185 determines that the waveform of the input voltage is abnormal. By contrast, the determined abnormality count during the second determination period is smaller than the second determined abnormality count threshold, the determiner 185 determines that the waveform of the input voltage is normal. When the determiner 185 determines that the waveform of the input voltage is normal during the second determination period, the determiner 185 again performs the pre-determination operation.

The counter 184, which includes, for example, a counter, counts the determined abnormality count determined by the determiner 185. The counter 184 transmits information indicating the counted determined abnormality count to the determiner 185.

When the determiner 185 determines that the waveform of the input voltage is abnormal during the first determination period, the instruction circuit 181 outputs an open command signal to the mechanical relays 111A, 121A, and 131A to open the closed mechanical relays 111A, 121A, and 131A among the mechanical relays 111A, 121A, 131A, 111B, 121B, and 131B. After the instruction circuit 181 outputs the open command signal, when it is determined that the waveform of the input voltage is normal during the second determination period, the instruction circuit 181 outputs a close command signal to the mechanical relays 111A, 121A, and 131A to close the mechanical relays 111A, 121A, and 131A, which have received the open command signal. At this time, the instruction circuit 181 continuously outputs an ON command signal to the semiconductor switches 112A, 122A, and 132A coupled in parallel with the mechanical relays 111A, 121A, and 131A to maintain the semiconductor switches 112A, 122A, and 132A in the ON state. This increases the amount of alternating current that the power source PA1 can supply to the switching module 1.

After the instruction circuit 181 outputs the open command signal, when the determiner 185 determines that the waveform of the input voltage is normal during the second determination period, the instruction circuit 181 outputs a close command signal to the mechanical relays 111A, 121A, and 131A to close the mechanical relays 111A, 121A, and 131A, which have received the open command signal. At this time, the instruction circuit 181 continuously outputs an ON command signal to the semiconductor switches 112A, 122A, and 132A coupled in parallel with the mechanical relays 111A, 121A, and 131A to maintain the semiconductor switches 112A, 122A, and 132A in the ON state.

After the instruction circuit 181 outputs the open command signal, when the determiner 185 determines that the waveform of the input voltage is abnormal during the second determination period, the instruction circuit 181 refrains from outputting a close command signal to the mechanical relays 111A, 121A, and 131A, to which the close command signal is supposed to be outputted. The instruction circuit 181 subsequently outputs an OFF command signal to the semiconductor switches 112A, 122A, and 132A to drive the semiconductor switches 112A, 122A, and 132A into the OFF state. For this operation, the instruction circuit 181 monitors the contact state notification signal inputted by the mechanical relays 111A, 121A, and 131A. When the mechanical relays 111A, 121A, and 131A stop outputting the contact state notification signal, the instruction circuit 181 drives the semiconductor switches 112A, 122A, and 132A into the OFF state. This configuration prevents the occurrence of arc discharge between the movable and stationary contacts of the contact switch Ry when the mechanical relays 111A, 121A, and 131A are changed from the closed state to the open state.

Next, the instruction circuit 181 outputs a close command signal to the mechanical relays 111B, 121B, and 131B, which are different from the mechanical relays 111A, 121A, and 131A. At this time, the instruction circuit 181 outputs an ON command signal to the semiconductor switches 112B, 122B, and 132B coupled in parallel with the mechanical relays 111B, 121B, and 131B to drive the semiconductor switches 112B, 122B, and 132B in the ON state.

Next, a switching control operation performed by the controller 18 according to the present preferred embodiment will be described with reference to FIGS. 4 to 6. At the start of the switching control operation, the mechanical relays 111A, 121A, and 131A of the switching module 1 are all closed, and the semiconductor switches 112A, 122A, and 132A are all in the ON state. The mechanical relays 111B, 121B, and 131B of the switching module 1 are all open, and the semiconductor switches 112B, 122B, and 132B are all in the OFF state. As a result, AC power is supplied from the power source PA1 to the power converter 2, while the supply of AC power from the power source PB1 to the power converter 2 is cut off.

Figure 4:
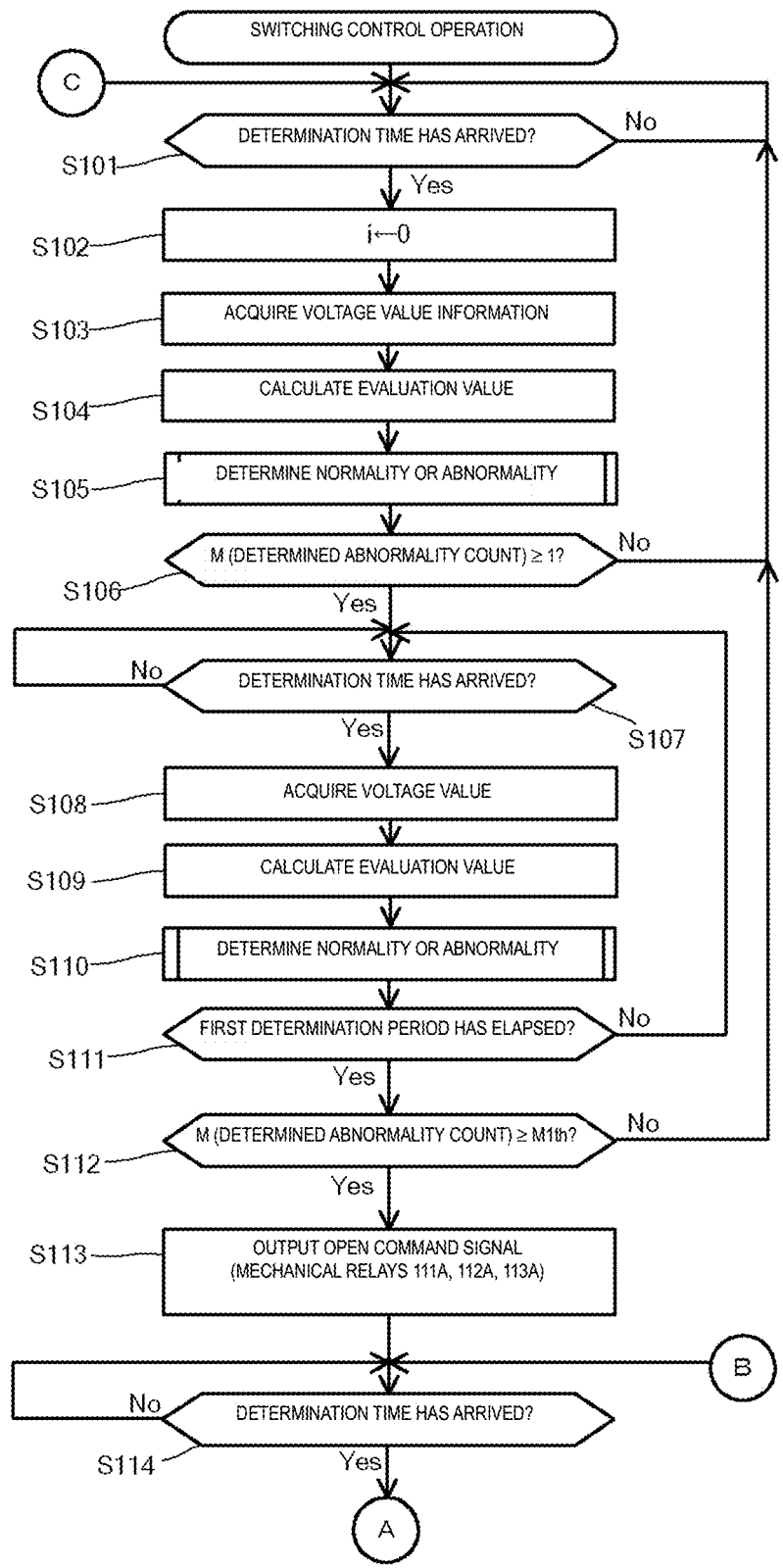
FIG. 4 is a flowchart illustrating a switching control operation performed by a controller according to a preferred embodiment of the present invention.

Firstly, as illustrated in FIG. 4, the voltage acquirer 182 determines whether the preset determination time has arrived (step S101). When the determination time has not arrived (No in step S101), the voltage acquirer 182 repeats the operation in step S101. When the voltage acquirer 182 determines that the determination time has arrived (Yes in step S101), the counter 184 sets the count value "i" of the determined abnormality count to "0" (step S102). The voltage acquirer 182 subsequently acquires voltage value information indicating an instantaneous value of the input voltage inputted to the power converter 2 and detected by each of the voltage detectors 151, 152, and 153 (step S103). Next, the evaluation value calculator 183 calculates, in accordance with the instantaneous value of the input voltage indicated by the voltage value information acquired by the voltage acquirer 182, an evaluation value to determine whether the waveform of the input voltage is abnormal (step S104). Subsequently, the abnormality determination operation is performed to determine whether the waveform of the input voltage is abnormal (step S105).

Figure 5:
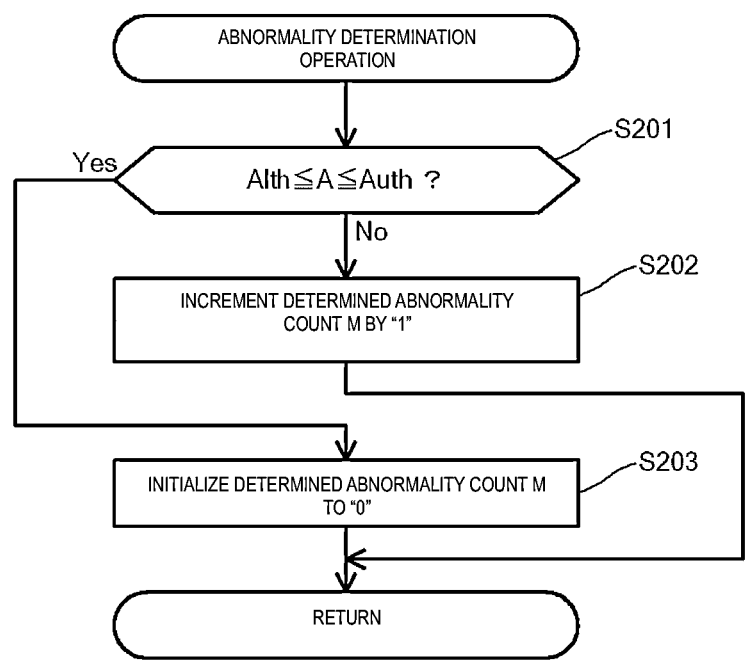
FIG. 5 is a flowchart illustrating an abnormality determination operation performed by the controller according to a preferred embodiment of the present invention.
Figure 6:
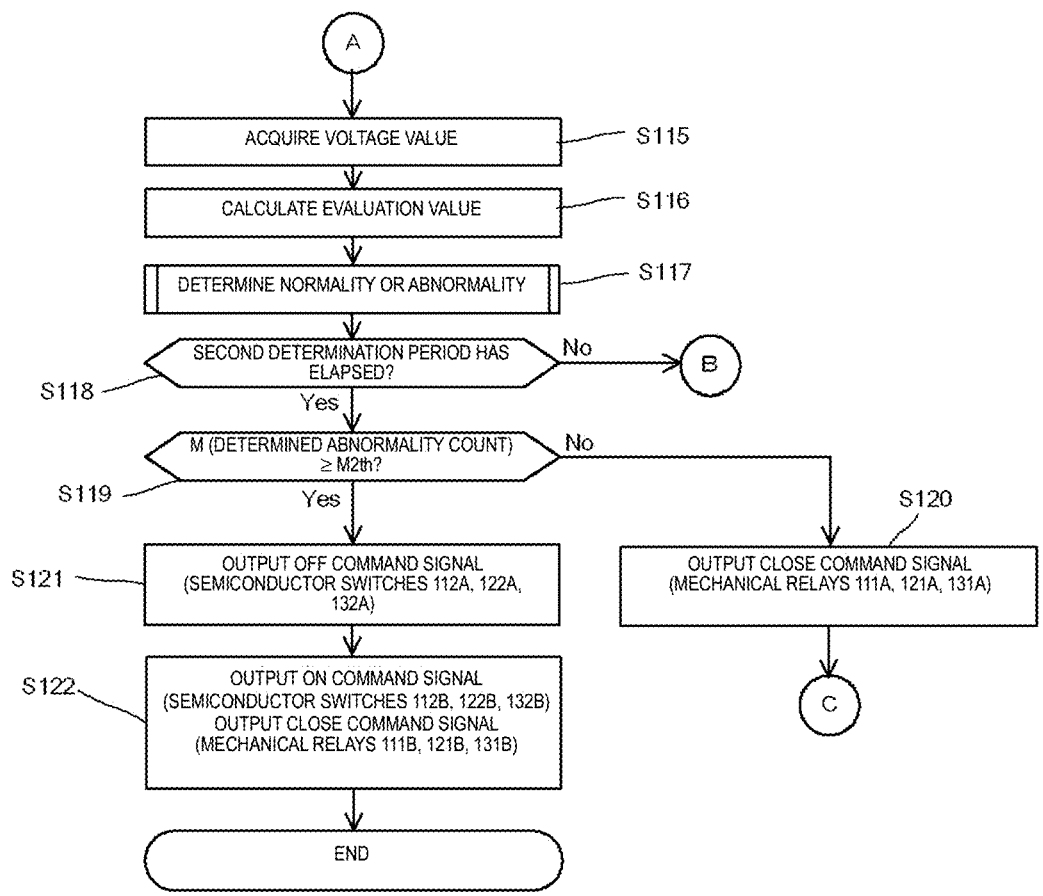
FIG. 6 is a flowchart illustrating the switching control operation performed by the controller according to a preferred embodiment of the present invention.

The following describes in detail the abnormality determination operation with reference to FIG. 5. Firstly, the determiner 185 determines whether an evaluation value A calculated by the evaluation value calculator 183 is within the reference range, more specifically, a range of a lower limit value Alth to an upper limit value Auth (step S201). When the determiner 185 determines that the evaluation value A is outside the reference range, in other words, smaller than the lower limit value Alth or greater than the upper limit value Auth (No in step S201), the counter 184 increments a determined abnormality count M by "1" (step S202). In contrast, when the determiner 185 determines that the evaluation value A is within the reference range (Yes in step S201), the counter 184 initializes the determined abnormality count M to "0" (step S203).

Referring back to FIG. 4, the determiner 185 subsequently determines whether the determined abnormality count M is "1" or greater (step S106). When the determiner 185 determines that the determined abnormality count M is "0" (No in step S106), the operation in step S101 is repeated. In contrast, when the determiner 185 determines that the determined abnormality count M is "1" or greater (Yes in step S106), the voltage acquirer 182 determines whether the determination time has arrived (step S107). When the determination time has not arrived (No in step S107), the voltage acquirer 182 repeats the operation in step S107. When the voltage acquirer 182 determines that the determination time has arrived (Yes in step S107), the voltage acquirer 182 acquires the voltage value information indicating an instantaneous value of the input voltage inputted to the power converter 2 and detected by each of the voltage detectors 151, 152, and 153 (step S108). Next, the evaluation value calculator 183 calculates, in accordance with the instantaneous value of the input voltage indicated by the voltage value information acquired by the voltage acquirer 182, an evaluation value to determine whether the waveform of the input voltage is abnormal (step S109). Subsequently, the abnormality determination operation is performed to determine whether the waveform of the input voltage is abnormal (step S110).

Next, the determiner 185 determines whether the first determination period has elapsed (step S111). When the determiner 185 determines that the first determination period has not elapsed (No in step S111), the operation in step S107 is repeated. In contrast, when the determiner 185 determines that the first determination period has elapsed (Yes in step S111), the determiner 185 then determines whether the determined abnormality count M is equal to or greater than a first determined abnormality count threshold M1$th$ (step S112). When the determiner 185 determines that the determined abnormality count M is smaller than the first determined abnormality count threshold M1$th$ (No in step S112), the operation in step S101 is repeated. In contrast, when the determiner 185 determines that the determined abnormality count M is equal to or greater than the first determined abnormality count threshold M1$th$ (Yes in step S112), the instruction circuit 181 outputs an open command signal to the mechanical relays 111A, 121A, and 131A to open the mechanical relays 111A, 121A, and 131A (step S113).

Next, the voltage acquirer 182 determines whether the determination time has arrived (step S114). When the determination time has not arrived (No in step S114), the voltage acquirer 182 repeats the operation in step S114. When the voltage acquirer 182 determines that the determination time has arrived (Yes in step S114), as illustrated in FIG. 6, the voltage acquirer 182 acquires the voltage value information indicating an instantaneous value of the input voltage inputted to the power converter 2 and detected by each of the voltage detectors 131, 132, and 133 (step S115). The evaluation value calculator 183 then calculates, in accordance with the instantaneous value of the input voltage indicated by the voltage value information acquired by the voltage acquirer 182, an evaluation value to determine whether the waveform of the input voltage is abnormal (step S116). Subsequently, the abnormality determination operation is performed to determine whether the waveform of the input voltage is abnormal (step S117).

Next, the determiner 185 determines whether the second determination period has elapsed (step S118). When the determiner 185 determines that the second determination period has not elapsed (No in step S118), the operation in step S114 in FIG. 4 is repeated. In contrast, when the determiner 185 determines that the second determination period has elapsed (Yes in step S118) as illustrated in FIG. 6, the determiner 185 then determines whether the determined abnormality count M is equal to or greater than a second determined abnormality count threshold M2$th$ (step S119). Here, it is assumed that the determiner 185 determines that the determined abnormality count M is smaller than the second determined abnormality count threshold M2*th* (No in step S119). In this case, the instruction circuit 181 outputs a close command signal to the mechanical relays 111A, 121A, and 131A to again close the mechanical relays 111A, 121A, and 131A (step S120). Subsequently, the operation in step S101 is repeated.

Conversely, it is assumed that the determiner 185 determines that the determined abnormality count M is equal to or greater than the second determined abnormality count threshold M2*th* (YES in step S119). In this case, the instruction circuit 181 outputs an OFF command signal to the semiconductor switches 112A, 122A, and 132A to drive the semiconductor switches 112A, 122A, and 132A into the OFF state (step S121). The instruction circuit 181 then outputs an ON command signal to the semiconductor switches 112B, 122B, and 132B to drive the semiconductor switches 112B, 122B, and 132B into the ON state. At the same time, the instruction circuit 181 outputs an ON command signal to the mechanical relays 111B, 121B, and 131B to drive the mechanical relays 111B, 121B, and 131B into the ON state (step S122). The switching control operation consequently ends.

Figure 7:
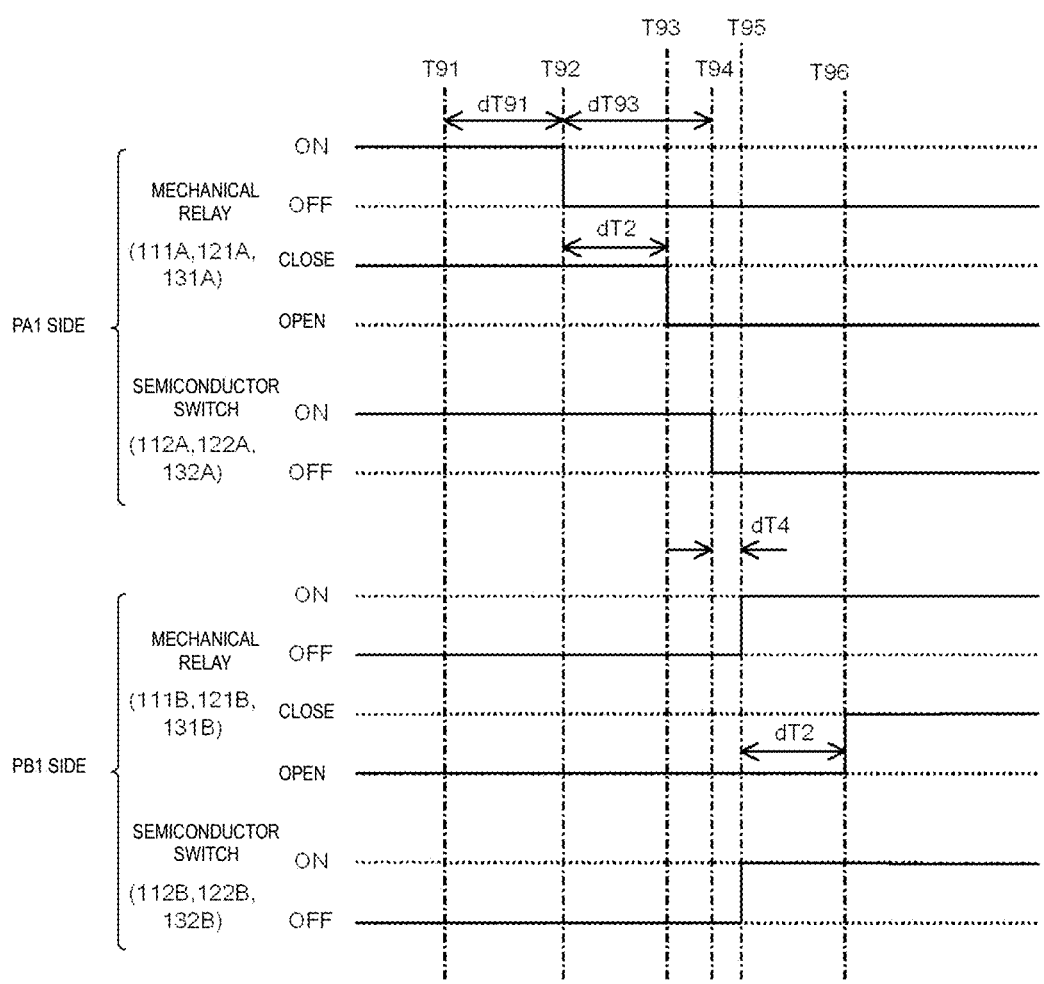
FIG. 7 is a timing diagram illustrating an operation of a switching module according to a comparative example.

The following describes an operation of the switching module 1 according to the present preferred embodiment by comparison with an operation of a switching module according to a comparative example. The hardware configuration of the switching module according to the comparative example is the same or substantially the same as the switching module 1. The switching module according to the comparative example differs from the switching module 1 in details of the switching control operation performed by the controller 18. Firstly, an operation of the switching module according to the comparative example will be described. When the switching module according to the comparative example is in an initial state, the power source PB1 stands by as a standby system. In other words, the mechanical relays 111A, 121A, and 131A are all closed, and the semiconductor switches 112A, 122A, and 132A are all in the ON state in the initial state. For example, as illustrated in FIG. 7, when the determination time arrives at a time T91, the controller 18 of the switching module according to the comparative example determines whether the waveform of the input voltage is abnormal during a preset determination period dT91. The determination period dT91 is set to, for example, a length long enough to accurately determine whether the waveform of the input voltage inputted is abnormal, which is, for example, equal in length to the second determination period. At a time T92, at which the determination period dT91 elapses since the time T91, the controller 18 determines that the waveform of the input voltage is abnormal, and the controller 18 outputs an open command signal to the mechanical relays 111A, 121A, and 131A. At a time T93, at which a response delay time dT2 elapses since the open command signal is outputted at the time T92, the mechanical relays 111A, 121A, and 131A are actually driven into the open state. The response delay time dT2 is determined in accordance with the performance of the mechanical relays 111A, 121A, and 131A. The response delay time dT2 may be, for example, about 4 msec. At a time T94, at which a preset waiting time dT3 elapses since the waveform of the input voltage is determined to be abnormal at the time T92, the controller 18 outputs an OFF command signal to the semiconductor switches 112A, 122A, and 132A to drive the semiconductor switches 112A, 122A, and 132A into the OFF state. The waiting time dT3 is set to be longer than the response delay time dT2 for the mechanical relays 111A, 121A, and 131A. The waiting time dT3 may be set to, for example, about 5 msec. Afterward, at a time T95, at which a preset dead time dT4 elapses since the time T94, the controller 18 outputs a close command signal to the mechanical relays 111B, 121B, and 131B and also an ON command signal to the semiconductor switches 112B, 122B, and 132B. At this step, the semiconductor switches 112B, 122B, and 132B are driven into the ON state when the ON command signal is inputted. The mechanical relays 111B, 121B, and 131B are actually driven into the closed state at a time T96, at which the response delay time dT2 elapses since the time T95. As described above, with the switching module according to the comparative example, when the waveform of the input voltage to the power converter 2 is abnormal, the total time of the determination period dT91, the waiting time dT3, the dead time dT4, and the response delay time dT2 is required to change the power supply of the power converter 2 to the power source PB1 after the determination time arrives.

Figure 8:
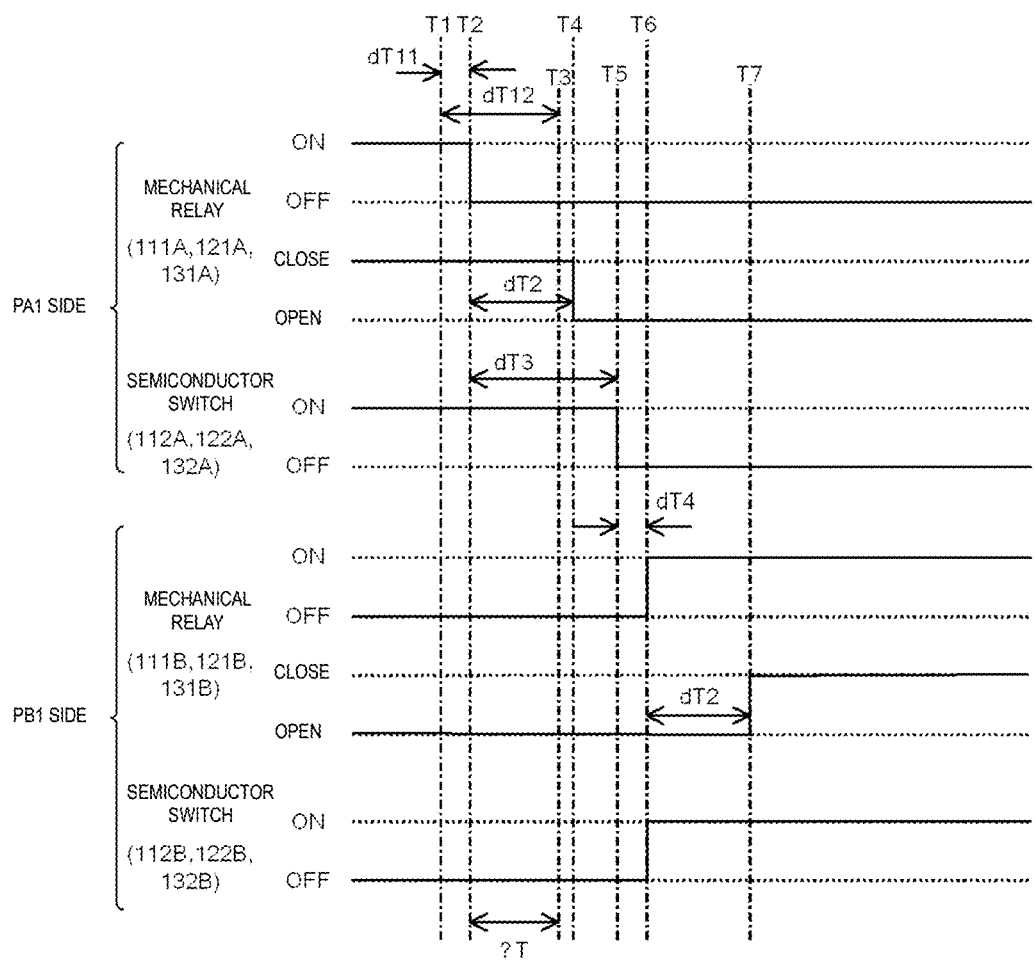
FIG. 8 is a timing diagram illustrating an operation of a switching module according to a preferred embodiment of the present invention.

The following describes an operation of the switching module 1 according to the present preferred embodiment when the waveform of the input voltage to the power converter 2 is abnormal. Similarly to the comparative example described above, when the switching module 1 is in an initial state, the power source PB1 stands by as a standby system. For example, as illustrated in FIG. 8, when the determination time arrives at a time T1, the controller 18 of the switching module 1 determines whether the waveform of the input voltage is abnormal during a first determination period dT11. The first determination period dT11 is set to a length long enough to determine that the waveform of the input voltage inputted to the power converter 2 can be abnormal. The first determination period dT11 may be set to, for example, 1 msec. At a time T2, at which the first determination period dT11 elapses since the time T1, the controller 18 determines that the waveform of the input voltage is abnormal, and the controller 18 outputs an open command signal to the mechanical relays 111A, 121A, and 131A. After the controller 18 outputs the open command signal, it is assumed that the controller 18 determines that the waveform of the input voltage is abnormal at a time T3, at which a second determination period dT12 elapses since the time T1. The second determination period dT12 is set to, for example, the same length as the determination period according to the comparative example, specifically about 4 msec. In this case, the controller 18 refrains from outputting a close command signal to the mechanical relays 111A, 121A, and 131A. At a time T4, at which the response delay time dT2 elapses since the open command signal is outputted at the time T2, the mechanical relays 111A, 121A, and 131A are actually driven into the open state. At a time T5, at which the waiting time dT3 elapses since the waveform of the input voltage is determined to be abnormal at the time T2, the controller 18 outputs an OFF command signal to the semiconductor switches 112A, 122A, and 132A to drive the semiconductor switches 112A, 122A, and 132A into the OFF state. Afterward, at a time T6, at which the dead time dT4 elapses since the time T5, the controller 18 outputs a close command signal to the mechanical relays 111B, 121B, and 131B and also an ON command signal to the semiconductor switches 112B, 122B, and 132B. At this step, the semiconductor switches 112B, 122B, and 132B are driven into the ON state when the ON command signal is inputted. The mechanical relays 111B, 121B, and 131B are actually driven into the closed state at a time T7, at which the response delay time dT2 elapses since the time T6. As described above, with the switching module 1, when the waveform of the input voltage to the power converter 2 is abnormal, the total time of the first determination period dT11, the waiting time dT3, the dead time dT4, and the response delay time dT2 is required to change the power supply of the power converter 2 to the power source PB1 after the determination time arrives. When the length of the second determination period dT12 is the same or substantially the same as the length of the determination period dT91 according to the comparative example, the time required to change the power supply of the power converter 2 to the power source PB1 after the determination time arrives is shorter than the switching module according to the comparative example by a time ΔT that is a difference between the second determination period dT12 and the first determination period dT11.

Figure 9:
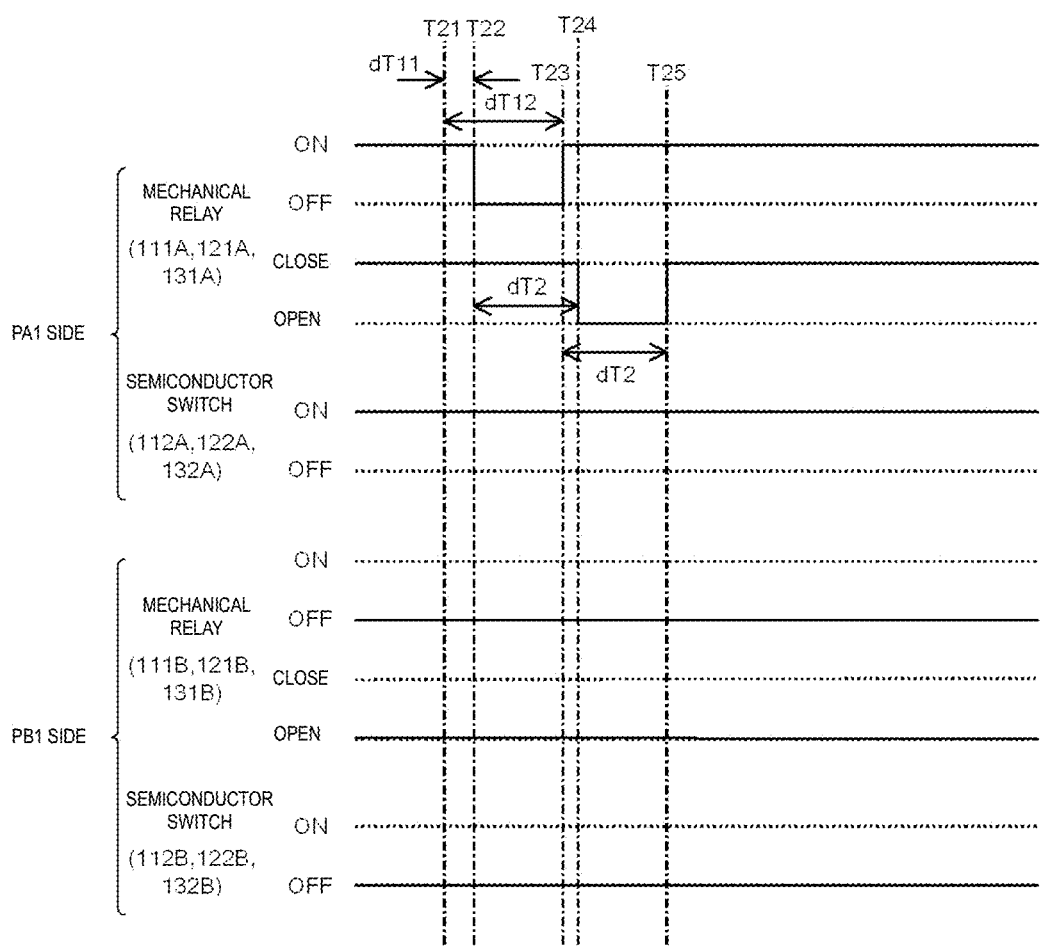
FIG. 9 is a timing diagram illustrating an operation of the switching module according to a preferred embodiment of the present invention.

Here, a description is provided for the case in which the abnormality in the waveform of the input voltage to the power converter 2 is not constant, but is a temporal phenomenon. In this case, for example, as illustrated in FIG. 9, at a time T21, at which the determination time arrives, the controller 18 determines whether the waveform of the input voltage is abnormal during the first determination period dT11. Next, at a time T22, at which the first determination period dT11 elapses since the time T21, when the controller 18 determines that the waveform of the input voltage is abnormal, the controller 18 outputs an open command signal to the mechanical relays 111A, 121A, and 131A. After the controller 18 outputs the open command signal, it is assumed that the controller 18 determines that the waveform of the input voltage is normal at a time T23, at which the second determination period dT12 elapses since the time T21. In this case, the controller 18 outputs a close command signal to the mechanical relays 111A, 121A, and 131A. At the same time, the controller 18 refrains from outputting an OFF command signal to the semiconductor switches 112A, 122A, and 132A. As a result, the semiconductor switches 112A, 122A, and 132A remain in the ON state. At a time T24, at which the response delay time dT2 elapses since the open command signal is outputted at the time T22, the mechanical relays 111A, 121A, and 131A are temporarily driven into the open state. At a time T25, at which the response delay time dT2 elapses since the close command signal is outputted at the time T23, the mechanical relays 111A, 121A, and 131A are again driven into the closed state. As such, when the abnormality in the waveform of the input voltage to the power converter 2 is not constant but temporal, the switching module 1 prevents the power supply to the power converter 2 from wrongly changing from the power source PA1 to the power source PB1.

As described above, in the switching module 1 according to the present preferred embodiment, when the controller 18 determines that the waveform of the input voltage to the power converter 2 is abnormal during the first determination period, the controller 18 outputs an open command signal to the mechanical relays 111A, 121A, and 131A to open the mechanical relays 111A, 121A, and 131A. Afterward, when the controller 18 determines that the waveform of the input voltage is normal during the second determination period, which is longer than the first determination period, the controller 18 outputs a close command signal to the mechanical relays 111A, 121A, and 131A to close the mechanical relays 111A, 121A, and 131A. When the controller 18 determines that the waveform of the input voltage is abnormal during the second determination period, the controller 18 outputs a close command signal to the mechanical relays 111B, 121B, and 131B in the open state, which are different from the mechanical relays 111A, 121A, and 131A, thus changing the power source electrically coupled the power converter 2 from the power source PA1 to the power source PB1. With this configuration, for example, by setting the second determination period to a length long enough to accurately determine whether the waveform of the input voltage is abnormal, the occurrence of malfunction in the switching module 1 can be reduced or prevented. Furthermore, when the waveform of the input voltage is abnormal, an open command signal is outputted to the mechanical relays 111A, 121A, and 131A when the first determination period shorter than the second determination period elapses, and thus, the operation of driving the mechanical relays 111A, 121A, and 131A into the open state can start earlier. Consequently, when the waveform of the input voltage is abnormal, it is possible to reduce the time required to change the power supply between the power sources PA1 and PB1.

The controller 18 according to the present preferred embodiment performs the pre-determination operation every time the preset determination time arrives. In the pre-determination operation, it is determined whether the waveform of the input voltage inputted to the power converter 2 is abnormal in accordance with an instantaneous value of the input voltage detected by each of the voltage detectors 151, 152, and 153 during a preset third determination period. The length of the third determination period is, for example, about several μsec. When it is determined that the waveform of the input voltage is abnormal in the preceding pre-determination operation, the controller 18 determines whether the waveform of the input voltage is abnormal during the first determination period. When it is determined that the waveform of the input voltage is normal in the preceding pre-determination operation, the controller 18 repeats the pre-determination operation. This means that only when it is determined that the waveform of the input voltage is abnormal in the preceding pre-determination operation, the controller 18 determines whether the waveform of the input voltage is abnormal during the subsequent first determination period. With this configuration, the controller 18 does not need to store information indicating the waveform of an input voltage during the first determination period in the previous time, and thus, it is possible to reduce the storage capacity required for the controller 18 by a corresponding amount. Moreover, the controller 18 does not need to analyze the information indicating the waveform of an input voltage during the first determination period in the previous time and determines whether the waveform is abnormal, and thus, it is possible to simplify the operation performed by the controller 18.

When the evaluation value, which is calculated based on an instantaneous value of the input voltage, is continuously outside the preset reference range for a preset reference period during the first determination period, the controller 18 according to the present preferred embodiment determines that the waveform of the input voltage is abnormal during the first determination period. With this configuration, the controller 18 does not need to store information indicating the waveform of an input voltage during the first determination period in the previous time, and thus, it is possible to reduce the storage capacity required for the controller 18 by a corresponding amount.

Figure 10:
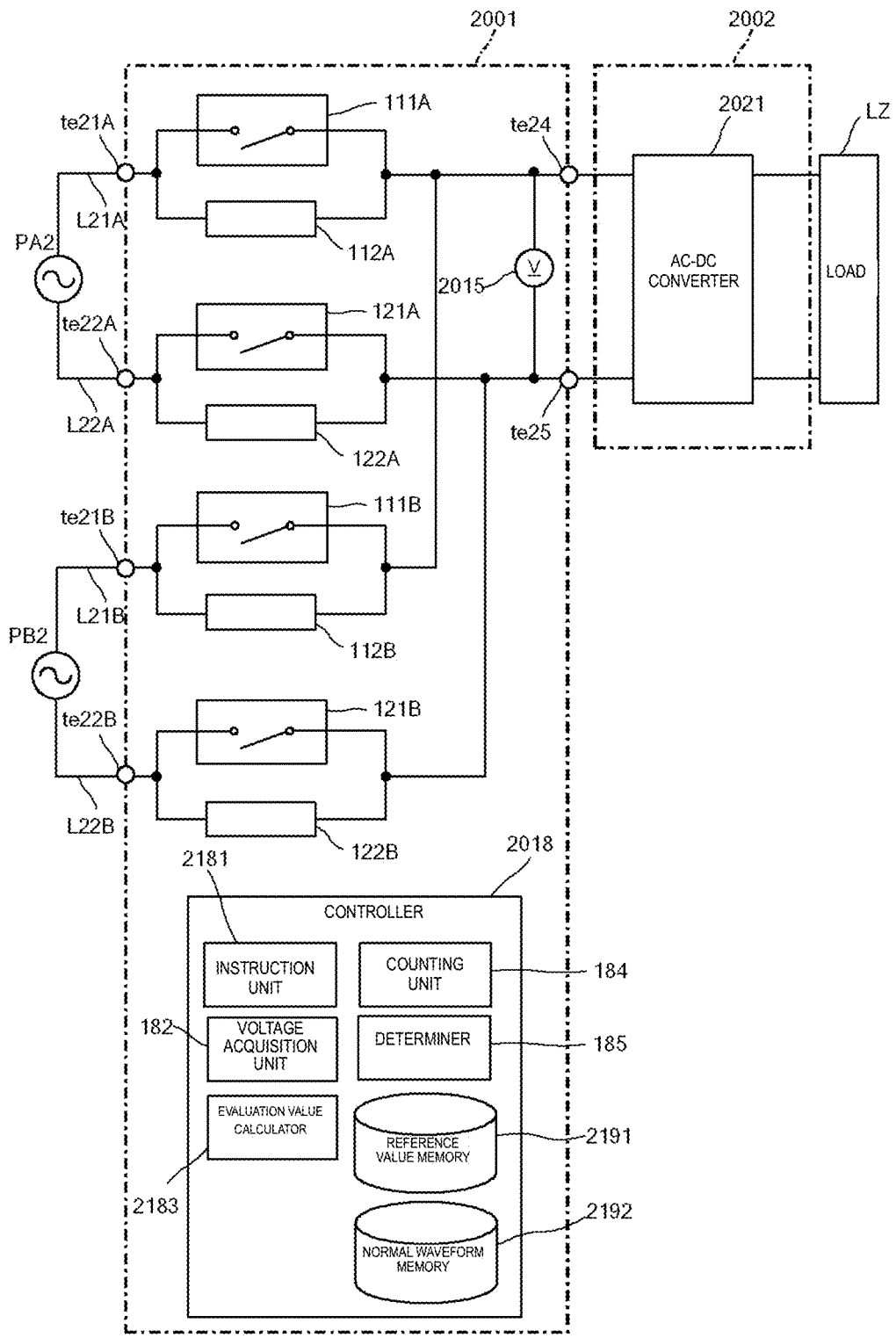
FIG. 10 schematically illustrates a configuration of a power supply system according to a modification of a preferred embodiment of the present invention.

Although the above has described the present preferred embodiment of the present invention, the present invention is not limited to the configuration of the present preferred embodiment. The power supply system may include, for example, a switching module 2001 and a power converter 2002 as illustrated in FIG. 10, and the power supply system may receive AC power from a single-phase power source PA2 or PB2 to supply DC power to the load LZ. In FIG. 10, the same or substantially the same configurations as the present preferred embodiment are denoted by the same reference characters as in FIG. 1. The power converter 2002 includes a single AC-DC converter 2021. The AC-DC converter 2021 has the same or substantially the same configuration as the AC-DC converters 21, 22, and 23 described in the present preferred embodiment. The switching module 2001 includes four mechanical relays 111A, 121A, 111B, and 121B, four semiconductor switches 112A, 122A, 112B, and 122B, and a voltage detector 2015, which are all coupled between the two power sources PA2 and PB2, and the power converter 2002. The switching module 2001 also includes four input terminals te21A, te22A, te21B, and te22B and two output terminals te24 and te25. The input terminals te21A and te22A are respectively coupled to power lines L21A and L22A coupled to the power source PA2. The input terminals te21B and te22B are respectively coupled to power lines L21B and L22B coupled to the power source PB2 as a standby system. A pair of input ends of the AC-DC converter 2021 are coupled between the output terminals te24 and te25. Similarly to the voltage detectors 151, 152, and 153 described in the present preferred embodiment, the voltage detector 2015, which is coupled between the output terminals te24 and te25, detects a voltage between the output terminals te24 and te25, that is, an input voltage to the AC-DC converter 2021.

A controller 2018 controls connection and disconnection of the four mechanical relays 111A, 121A, 111B, and 121B so as to electrically couple one of the two power sources PA2 and PB2 to the power converter 2002. The controller 2018 also controls ON state and OFF state of the semiconductor switches 112A, 122A, 112B, and 122B. Similarly to the present preferred embodiment, the controller 2018 includes a microcomputer and a memory. The microcomputer defines and functions as an instruction circuit 2181, the voltage acquirer 182, an evaluation value calculator 2183, the counter 184, and the determiner 185. The memory includes a reference value memory 2191 and a normal waveform memory 2192 to store information indicating a normal waveform of input voltage.

Figure 11:
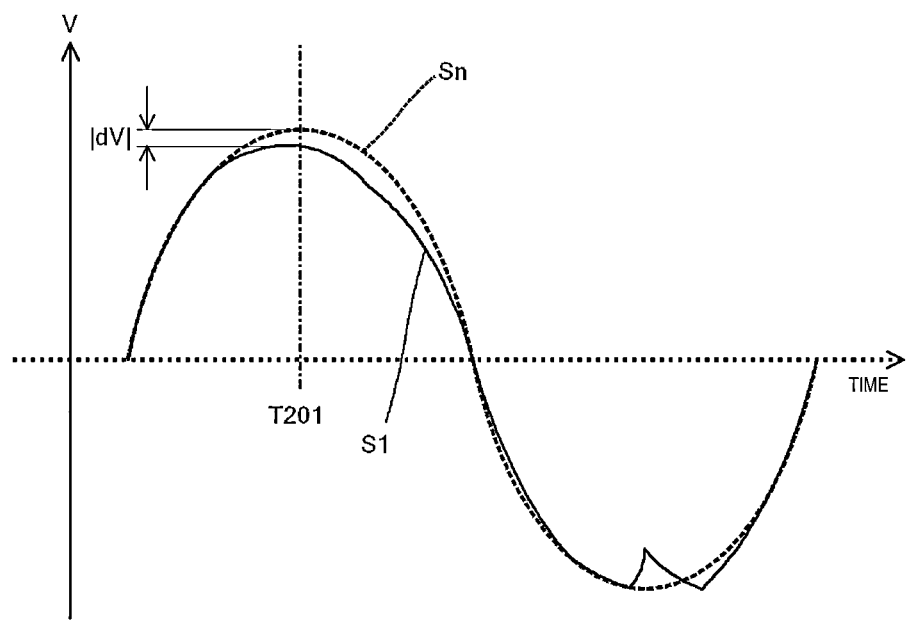
FIG. 11 a graph for explaining an operation of a switching module according to a modification of a preferred embodiment of the present invention.

The instruction circuit 2181 controls connection and disconnection of the mechanical relays 111A, 121A, 111B, and 121B by outputting an open or close command signal to the mechanical relays 111A, 121A, 111B, and 121B. The instruction circuit 2181 controls ON state and OFF state of the semiconductor switches 112A, 122A, 112B, and 122B by outputting an ON or OFF command signal to the semiconductor switches 112A, 122A, 112B, and 122B. The voltage acquirer 182 acquires information indicating an instantaneous value of the input voltage inputted to the power converter 2002 and detected by the voltage detector 2015. The evaluation value calculator 2183 calculates an evaluation value by obtaining the absolute value of a voltage difference between the normal waveform of input voltage and the actual waveform of the input voltage to the power converter 2002. Specifically, for example, as illustrated in FIG. 11, at a time T201, at which the determination time arrives, the evaluation value calculator 2183 calculates as an evaluation value an absolute value |dV| of a voltage difference between the input voltage at the time T201 of a normal waveform Sn and the voltage at the time T201 of an actual waveform S1 of input voltage.

Referring back to FIG. 10, similarly to the present preferred embodiment, in the pre-determination operation, when the evaluation value calculated by the evaluation value calculator 183 is outside the preset reference range, the determiner 185 determines that the waveform of the input voltage is abnormal. When the evaluation value is continuously outside the preset reference range for the preset first reference period during the first determination period, the determiner 185 determines that the waveform of the input voltage is abnormal during the first determination period. In the case in which the determiner 185 determines that the waveform of the input voltage is abnormal during the first determination period, when the evaluation value is continuously outside the reference range for the preset second reference period during the second determination period, the determiner 185 determines that the waveform of the input voltage is abnormal during the second determination period.

When the determiner 185 determines that the waveform of the input voltage is abnormal during the first determination period, the instruction circuit 2181 outputs an open command signal to the mechanical relays 111A and 121A to open the closed mechanical relays 111A and 121A. After the instruction circuit 281 outputs the open command signal, when it is determined that the waveform of the input voltage is normal during the second determination period, the instruction circuit 181 outputs a close command signal to the mechanical relays 111A and 121A to close the mechanical relays 111A and 121A, which have received the open command signal. After the instruction circuit 2181 outputs the open command signal, when the determiner 185 determines that the waveform of the input voltage is abnormal during the second determination period, the instruction circuit 2181 refrains from outputting a close command signal to the mechanical relays 111A, 121A, and 131A, to which the close command signal is supposed to be outputted. The instruction circuit 2181 subsequently outputs an OFF command signal to the semiconductor switches 112A and 122A to drive the semiconductor switches 112A and 122A into the OFF state.

This configuration can reduce the time required to change the power source of the power converter 2002 from the power source PA2 to the power source PB2 with the power supply system configured to receive AC power from the single-phase power source PA2 or PB2 and supply DC power to the load LZ.

Figure 12:
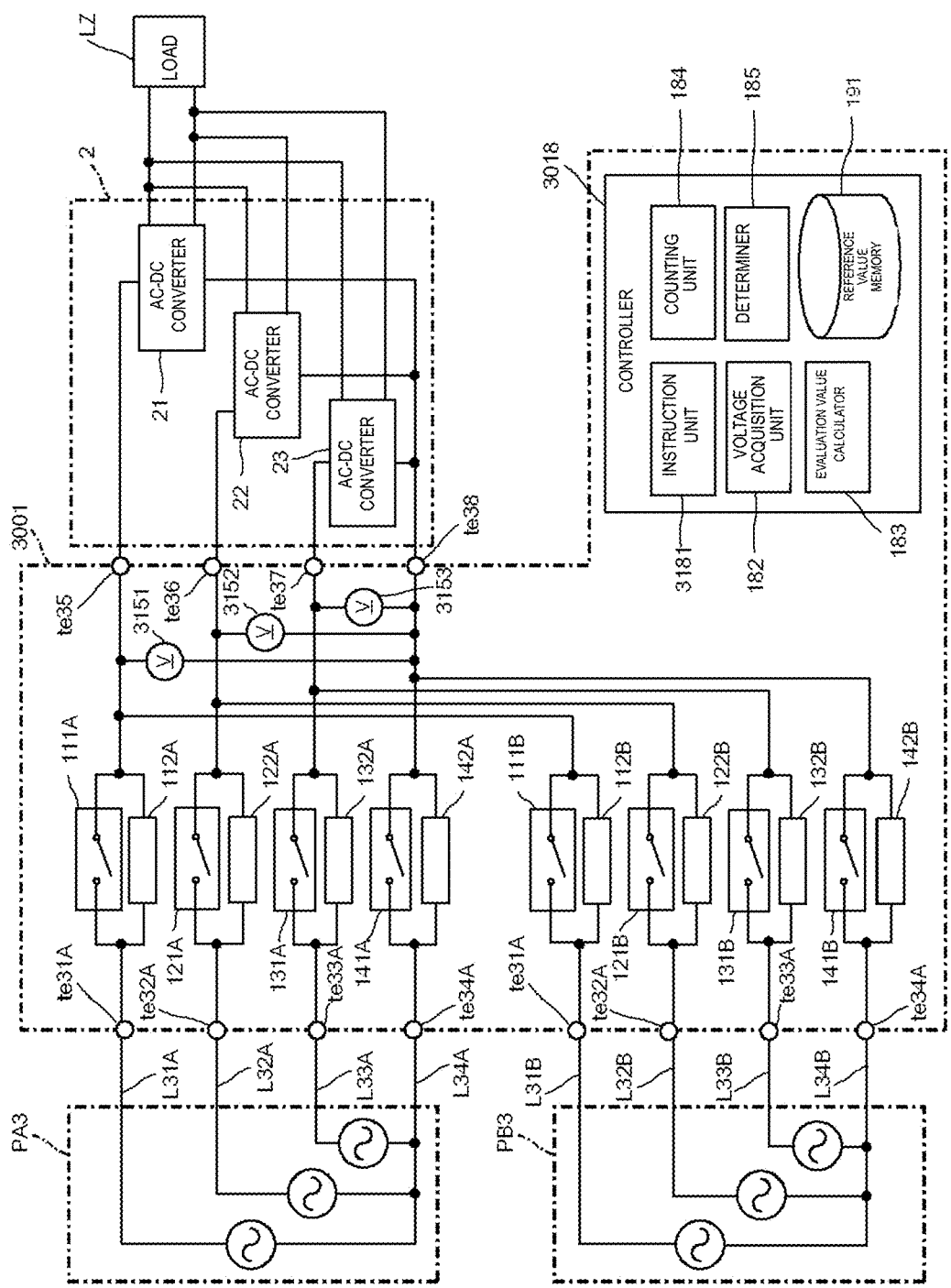
FIG. 12 schematically illustrates a configuration of a power supply system according to a modification of a preferred embodiment of the present invention.

The above-described preferred embodiment has described the example in which the power supply system receives three-phase AC power from the power source PA1 or PB1 including three delta-connected AC power sources and supply DC power to the load LZ. However, this should not be construed in a limiting sense. For example, as illustrated in FIG. 12, the power supply system may receive three-phase AC power from a power source PA3 or PB3 including three Y-connected AC power sources and supply DC power to the load LZ. In FIG. 12, the same or substantially the same configurations as the above-described preferred embodiment are denoted by the same reference characters as in FIG. 1. The power source PA3 supplies three-phase alternating currents through four power lines L31A, L32A, L33A, and L34A to the power supply system. The power source PB3 supplies three-phase alternating currents through four power lines L31B, L32B, L33B, and L34B to the power supply system.

The switching module 3001 includes eight mechanical relays 111A, 121A, 131A, 141A, 111B, 121B, 131B, and 141B, eight semiconductor switches 112A, 122A, 132A, 142A, 112B, 122B, 132B, and 142B, and voltage detectors 3151, 3152, and 3153, which are all coupled between the two power sources PA3 and PB3 and the power converter 2. The mechanical relays 141A and 141B have the same or substantially the same configuration as the mechanical relays 111A, 121A, 131A, 111B, 121B, and 131B. The semiconductor switches 142A and 142B have the same or substantially the same configuration as the semiconductor switches 112A, 122A, 132A, 112B, 122B, and 132B. The switching module 3001 includes eight input terminals te31A, te32A, te33A, te34A, te31B, te32B, te33B, and te34B and four output terminals te35, te36, te37, and te38. The input terminals te31A, te32A, te33A, and te34A are respectively coupled to the power lines L31A, L32A, L33A, and L34A coupled to the power source PA3. The input terminal te31B, te32B, te33B, te34B are respectively coupled to the power lines L31B, L32B, L33B, and L34B coupled to the power source PB3 as a standby system. A pair of input ends of the AC-DC converter 21 are coupled between the output terminals te35 and te38. A pair of input ends of the AC-DC converter 22 are coupled between the output terminals te36 and te38. A pair of input ends of the AC-DC converter 23 are coupled between the output terminals te37 and te38. The voltage detector 3151, which is coupled between the output terminals te35 and te38, detects a voltage between the output terminals te35 and te38, that is, an input voltage to the AC-DC converter 21. The voltage detector 3152, which is coupled between the output terminals te36 and te38, detects a voltage between the output terminals te36 and te38, that is, an input voltage to the AC-DC converter 22. The voltage detector 3153, which is coupled between the output terminals te37 and te38, detects a voltage between the output terminals te37 and te38, that is, an input voltage to the AC-DC converter 23.

The controller 3018 controls connection and disconnection of the eight mechanical relays 111A, 121A, 131A, 141A, 111B, 121B, 131B, and 141B so as to electrically couple one of the two power sources PA3 and PB3 to the power converter 2. The controller 3018 also controls ON state and OFF state of the semiconductor switches 112A, 122A, 132A, 142A, 112B, 122B, 132B, and 142B. Similarly to the above-described preferred embodiment, the controller 3018 includes, for example, a microcomputer and a memory. The microcomputer defines and functions as an instruction circuit 3181, the voltage acquirer 182, the evaluation value calculator 183, the counter 184, and the determiner 185. The memory includes the reference value memory 191.

The instruction circuit 3181 controls connection and disconnection of the mechanical relays 111A, 121A, 131A, 141A, 111B, 121B, 131B, and 141B by outputting an open or close command signal to the mechanical relays 111A, 121A, 131A, 141A, 111B, 121B, 131B, and 141B. The instruction circuit 3181 controls ON state and OFF state of the semiconductor switches 112A, 122A, 132A, 142A, 112B, 122B, 132B, and 142B by outputting an ON or OFF command signal to the semiconductor switches 112A, 122A, 132A, 142A, 112B, 122B, 132B, and 142B. The voltage acquirer 182 acquires information indicating an instantaneous value of the input voltage inputted to the power converter 2 and detected by each of the voltage detectors 3151, 3152, and 3153. Similarly to the above-described preferred embodiment, the evaluation value calculator 183 calculates the evaluation value, based on the sum of the square of an instantaneous value of each of the three-phase voltage inputs to the power converter 2.

Similarly to the above-described preferred embodiment, in the pre-determination operation, when the evaluation value calculated by the evaluation value calculator 183 is outside the preset reference range, the determiner 185 determines that the waveform of the input voltage is abnormal. When the evaluation value is continuously outside the preset reference range for the preset first reference period during the first determination period, the determiner 185 determines that the waveform of the input voltage is abnormal during the first determination period. In the case in which the determiner 185 determines that the waveform of the input voltage is abnormal during the first determination period, when the evaluation value is continuously outside the reference range for the preset second reference period during the second determination period, the determiner 185 determines that the waveform of the input voltage is abnormal during the second determination period.

When the determiner 185 determines that the waveform of the input voltage is abnormal during the first determination period, the instruction circuit 3181 outputs an open command signal to the mechanical relays 111A, 121A, 131A, and 141A to open the closed mechanical relays 111A, 121A, and 131A, 141A. After the instruction circuit 3181 outputs the open command signal, when it is determined that the waveform of the input voltage is normal during the second determination period, the instruction circuit 181 outputs a close command signal to the mechanical relays 111A, 121A, 131A, and 141A. After the instruction circuit 3181 outputs the open command signal, when the determiner 185 determines that the waveform of the input voltage is abnormal during the second determination period, the instruction circuit 3181 refrains from outputting a close command signal to the mechanical relays 111A, 121A, 131A, and 141A. The instruction circuit 3181 subsequently outputs an OFF command signal to the semiconductor switches 112A, 122A, 132A, and 142A to drive the semiconductor switches 112A, 122A, 132A, and 142A into the OFF state.

This configuration can reduce the time required to change the power source of the power converter 2 from the power source PA3 to the power source PB3 with the power supply system configured to receive three-phase AC power from the power source PA3 or PB3 including Y-connected AC power sources and supply DC power to the load LZ.

In the above-described preferred embodiment, the controller 18 may include a determination period setter (not illustrated in the drawing) to extend the first determination period by a preset unit period in accordance with whether the determiner 185 determines abnormality. This means that when the condition in which the determination result differs between the first and second determination periods is consecutively repeated a predetermined number of times, the controller 18 may update the first determination period to a longer period. In this case, the counter 184 counts an open/close repeat count during a preset extension determination period. The open/close repeat count indicates, when an open command signal is outputted to the mechanical relays 111A, 121A, 131A, 111B, 121B, and 131B after the first determination period, how many times a close command signal is subsequently outputted to the mechanical relays 111A, 121A, 131A, 111B, 121B, and 131B, which have received the open command signal, after the second determination period. When the determiner 185 determines that the open/close repeat count is equal to or greater than a preset extension determination reference count, the determination period setter may extend the first determination period by a preset unit period. In other words, in the case in which the determiner 185 determines that the waveform of the input voltage to the power converter 2 is abnormal during the first determination period, and the determiner 185 further determines that the waveform of the input voltage is normal during the second determination period, when this condition is consecutively repeated with a frequency of the preset extension determination reference count or more during the preset extension determination period preset, the first determination period may be extended by a preset unit period.

Figure 13:
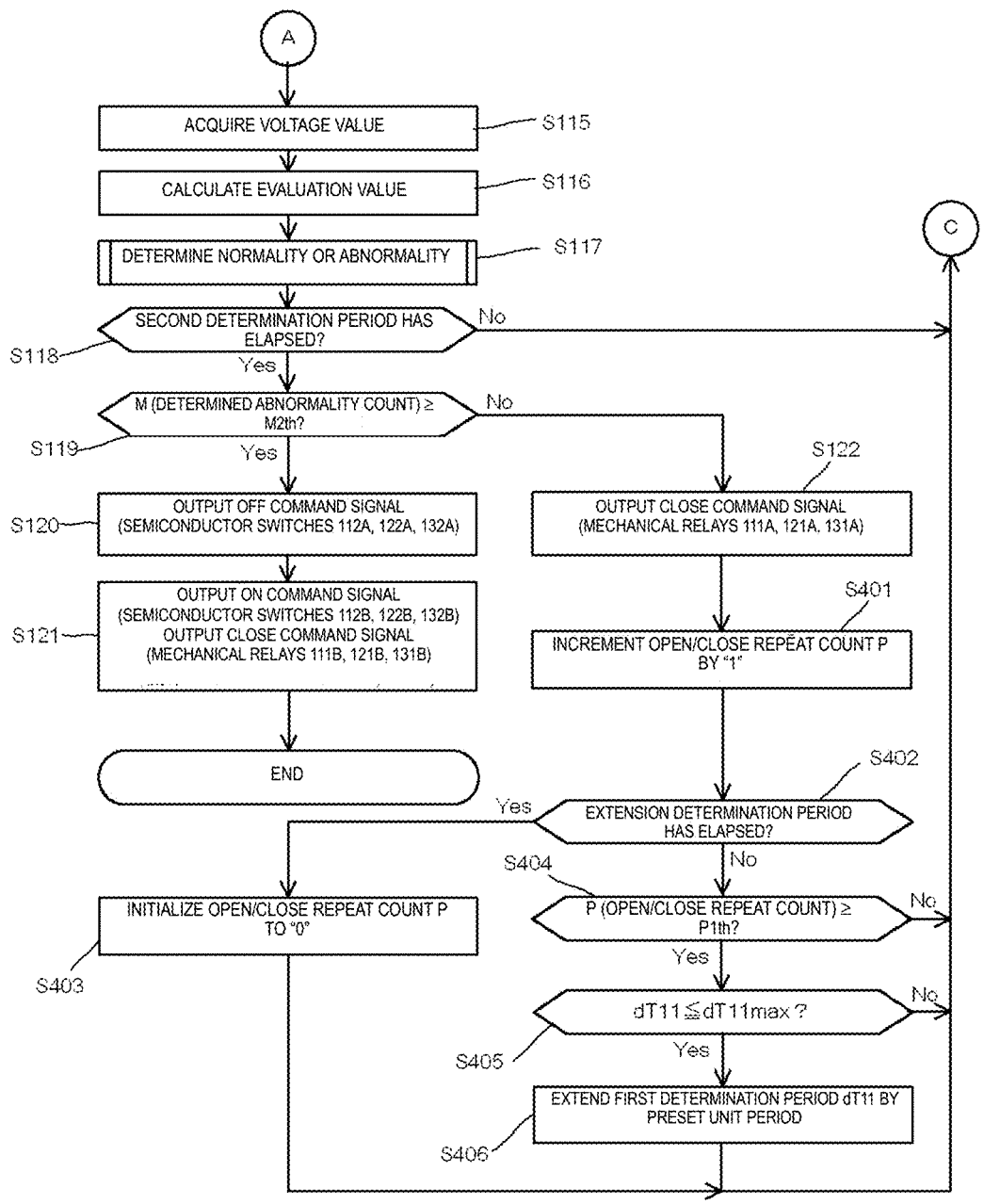
FIG. 13 is a flowchart illustrating a switching control operation performed by a controller according to a modification of a preferred embodiment of the present invention.

The following describes details of a switching control operation performed by the controller 18 according to this modification with reference to FIG. 13. Firstly, the controller 18 performs a series of the operations in steps S101 to S114 illustrated in FIG. 4. It is assumed that in step S114 the voltage acquirer 182 determines whether the determination time has arrived (Yes in step S114). In this case, as illustrated in FIG. 13, a series of the operations in steps S115 to S119 are performed. It is assumed that in step S119 the determiner 185 determines that the determined abnormality count M is smaller than the second determined abnormality count threshold M2th (No in step S119). In this case, the instruction circuit 181 outputs a close command signal to the mechanical relays 111A, 121A, and 131A (step S122). Next, the counter 184 increments the open/close repeat count P by "1" (step S401). Next, the determiner 185 determines whether the preset extension determination period has elapsed (step S402). The extension determination period may be set to, for example, one day or one year. When the determiner 185 determines that the preset extension determination period has elapsed (Yes in step S402), the counter 184 initializes the open/close repeat count to "0" (step S403), and the operation in step S101 illustrated in FIG. 4 is repeated. In step S119, when the determiner 185 determines that the determined abnormality count M is equal to or greater than the second determined abnormality count threshold M2th (Yes in step S119), the operations in step S120 and the subsequent steps are repeated.

Referring back to FIG. 13, conversely, when the determiner 185 determines that the extension determination period has not elapsed yet (No in step S402), the determiner 185 determines whether the open/close repeat count P is equal to or greater than an extension determination reference count P1th (step S404).

When the determiner 185 determines that the open/close repeat count P is smaller than the extension determination reference count P1th (No in step S404), the operation in step S101 illustrated in FIG. 4 is repeated. Referring back to FIG. 13, conversely, when the determiner 185 determines that the open/close repeat count P is equal to or greater than the extension determination reference count P1th (Yes in step S404), the determiner 185 further determines whether the first determination period dT11 is equal to or shorter than a preset first determination period upper limit dT11max (step S405). When the determiner 185 determines that the first determination period dT11 exceeds the first determination period upper limit dT11max (No in step S405), the operation in step S101 illustrated in FIG. 4 is repeated. Referring back to FIG. 13, conversely, when the determiner 185 determines that the first period dT11 is equal to or shorter than the first period upper limit dT11max (Yes in step S405), the determination period setter extends the first determination period dT11 by a preset unit period (step S406). Subsequently, the operation in step S101 illustrated in FIG. 4 is repeated.

With this configuration, the determination period setter sets the first determination period dT11 to an appropriate length so as to reduce the condition in which, when an open command signal is outputted to the mechanical relays 111A, 121A, 131A, 111B, 121B, and 131B after the first determination period, a close command signal is subsequently outputted to the mechanical relays 111A, 121A, 131A, 111B, 121B, and 131B, which have received the open command signal, after the second determination period. This can decrease the frequency of opening and closing the mechanical relays 111A, 121A, 131A, 111B, 121B, and 131B, and as a result, it is possible to reduce the abrasion of contacts of the mechanical relays 111A, 121A, 131A, 111B, 121B, and 131B.

Figure 14:
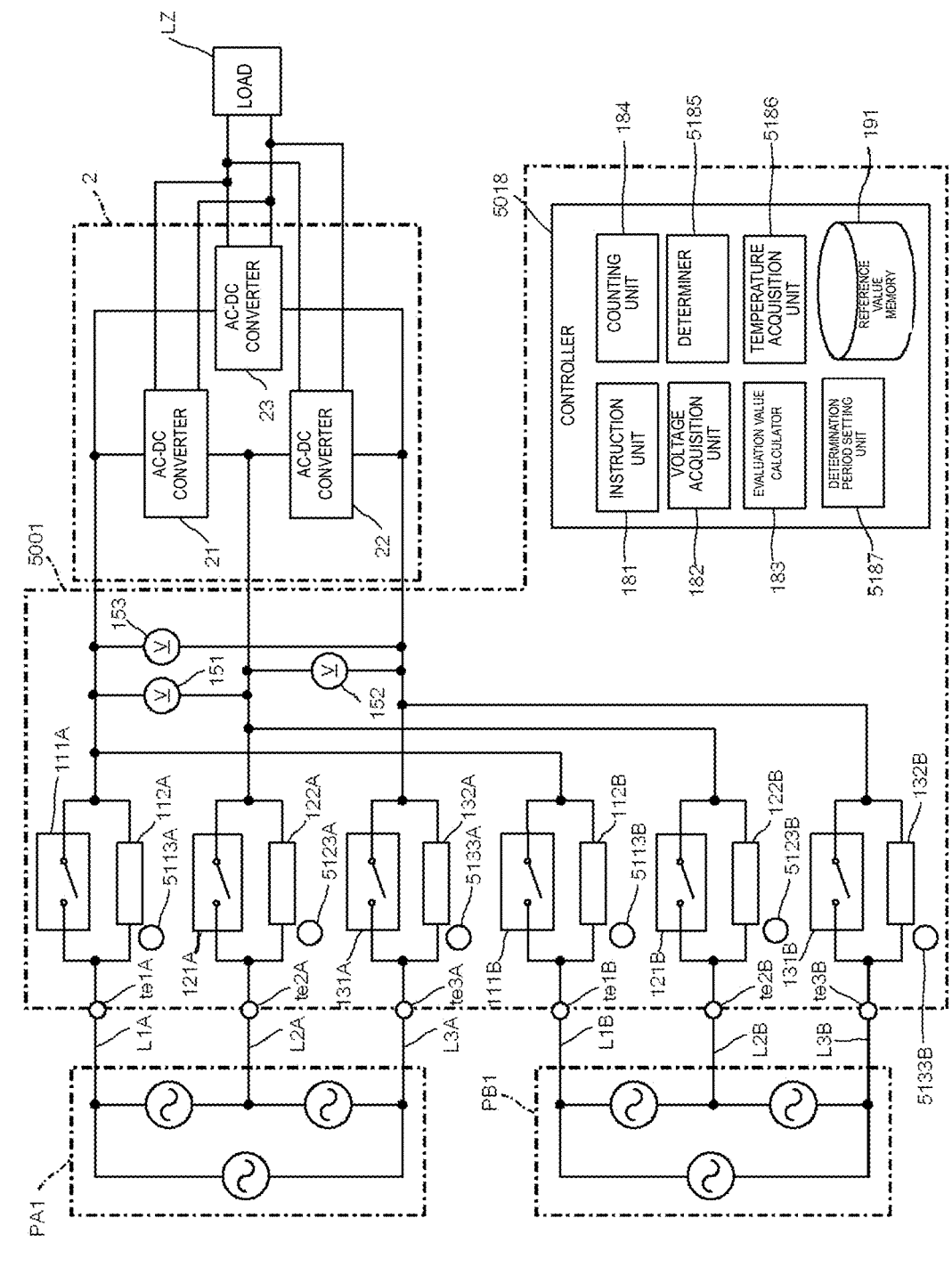
FIG. 14 schematically illustrates a configuration of a power supply system according to a modification of a preferred embodiment of the present invention.

In the present preferred embodiment, the controller 18 may extend the first determination period by a preset unit period in accordance with the temperature of each of the semiconductor switches 112A, 122A, 132A, 112B, 122B, and 132B. In a power supply system according to this modification, for example, as illustrated in FIG. 14, a switching module 5001 includes temperature detectors 5113A, 5123A, 5133A, 5113B, 5123B, and 5133B to detect a temperature of the respective semiconductor switches 121A, 122A, 132A, 121B, 122B, and 132B. A controller 5018 includes a temperature acquirer 5186 to acquire information indicating the temperature detected by the temperature detectors 5113A, 5123A, 5133A, 5113B, 5123B, and 5133B and a determination period setter 5187 to extend the first determination period in accordance with the temperature indicated by the information acquired by the temperature acquirer 5186. A determiner 5185 performs the operations described in the present preferred embodiment and also determines whether the temperature detected by at least one of the temperature detectors 5113A, 5123A, 5133A, 5113B, 5123B, and 5133B is equal to or higher than a preset reference temperature. Here, the reference temperature is determined by the temperature performance of the semiconductor switches 121A, 122A, 132A, 121B, 122B, and 132B. The reference temperature may be set to, for example, about 125° C. When the determiner 5185 determines that the temperature detected by at least one of the temperature detectors 5113A, 5123A, 5133A, 5113B, 5123B, and 5133B is equal to or higher than the reference temperature, the determination period setter 5187 extends the first determination period by a preset unit period. Here, the length of the unit period may be set to, for example, about 0.5 msec.

Figure 15:
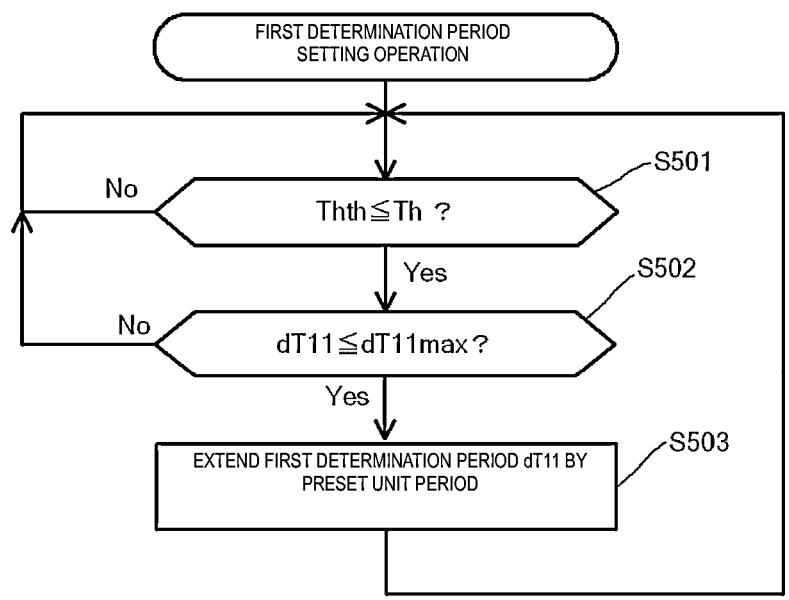
FIG. 15 is a flowchart illustrating a first determination period setting operation performed by a controller according to a modification of a preferred embodiment of the present invention.

The following describes details of a first determination period setting operation performed by the controller 5018 according to this modification with reference to FIG. 15. The first determination period setting operation is performed in parallel with the switching control operation described in the preferred embodiment with reference to FIGS. 4 to 6. Firstly, the determiner 5185 determines whether a temperature Th detected by at least one of the temperature detectors 5113A, 5123A, 5133A, 5113B, 5123B, and 5133B is equal to or higher than a reference temperature Thth (step S501). When the determiner 5185 determines that the temperature Th detected by each of the temperature detectors 5113A, 5123A, 5133A, 5113B, 5123B, and 5133B is lower than the reference temperature Thth (No in step S501), the operation in step S501 is repeated. Conversely, it is assumed that the determiner 5185 determines that the temperature Th detected by at least one of the temperature detectors 5113A, 5123A, 5133A, 5113B, 5123B, and 5133B is equal to or higher than a reference temperature Thth (Yes in step S501). In this case, the determiner 5185 determines whether the first determination period dT11 is equal to or shorter than the preset first determination period upper limit dT11max (step S502). When the determiner 5185 determines that the first determination period dT11 exceeds the first determination period upper limit dT11max (No in step S502), the determiner 5185 repeats the operation in step S501. Conversely, when the determiner 5185 determines that the first determination period dT11 is equal to or shorter than the first determination period upper limit dT11max (Yes in step S502), the determination period setter 5187 extends the first determination period dT11 by the preset unit period (step S503). Subsequently, the operation in step S501 is repeated.

This configuration can decrease the frequency in which the mechanical relays 121A, 112A, 131A, 121B, 112B, and 131B are open while the semiconductor switches 112A, 122A, 132A, 112B, 122B, and 132B are maintained in the ON state. This means that it is possible to decrease the frequency in which the alternating current supplied by the power source PA1 or PB1 flows into only the semiconductor switches 112A, 122A, 132A, 112B, 122B, and 132B, and as a result, loads on the semiconductor switches 112A, 122A, 132A, 112B, 122B, and 132B are decreased, thus reducing failures of the semiconductor switches 112A, 122A, 132A, 112B, 122B, and 132B.

Figure 16:
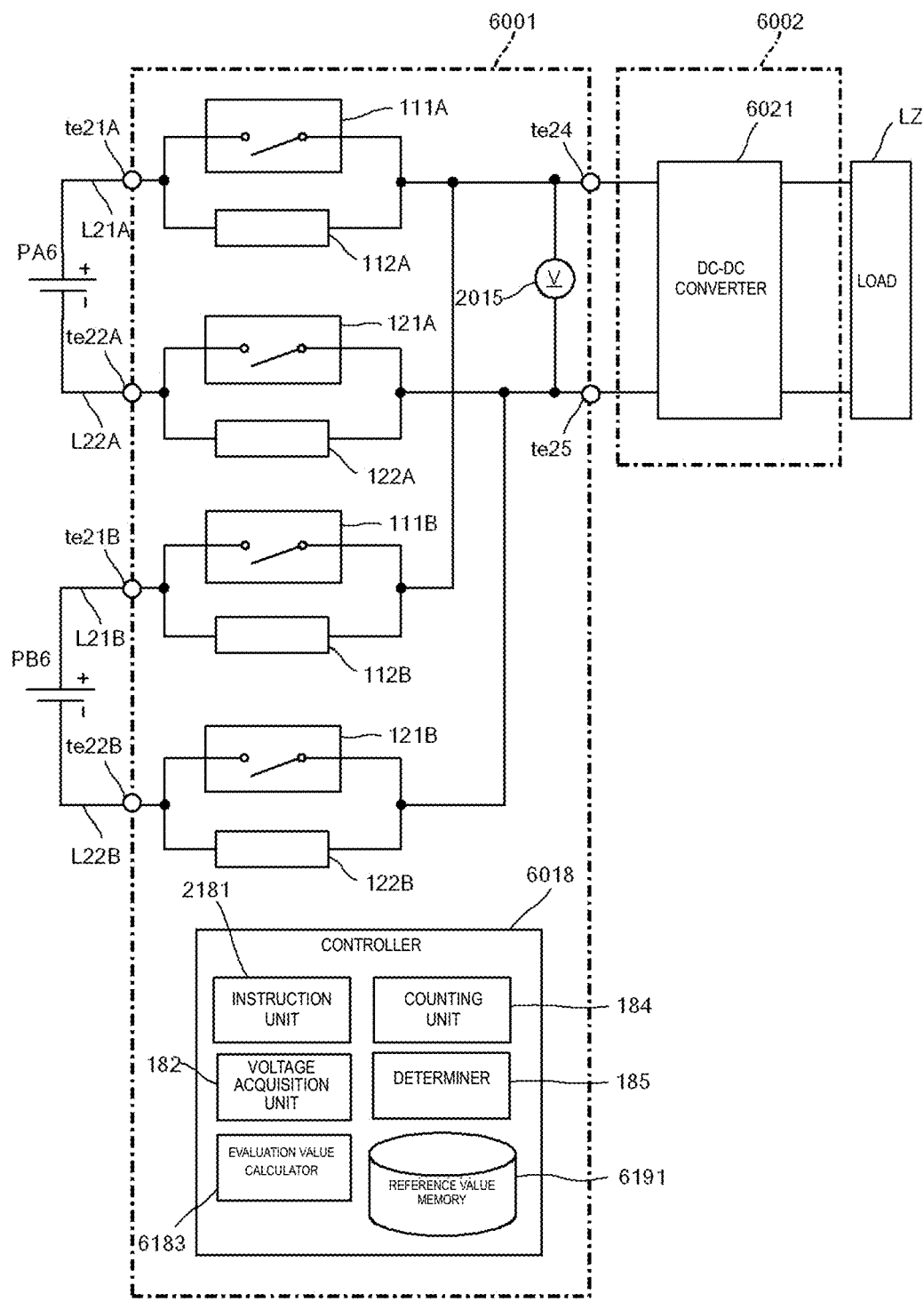
FIG. 16 schematically illustrates a configuration of a power supply system according to a modification of a preferred embodiment of the present invention.

The present preferred embodiment has described an example in which the power supply system receives AC power from the power source PA1 or PB1 as a three-phase AC power source and supply DC power to the load LZ. However, this should not be construed in a limiting sense. For example, as illustrated in FIG. 16, the power supply system may step up or down DC power supplied by a power source PA6 or PB6 as a DC power source and supply the DC power to the load LZ. In FIG. 16, the same or substantially the same configurations as the modification described with reference to FIG. 10 are denoted by the same reference characters as in FIG. 10. The power sources PA6 and PB6 are, for example, secondary batteries. The power supply system includes a switching module 6001 and a power converter 6002. The power converter 6002 includes a DC-DC converter 6021.

A controller 6018 of the switching module 6001 includes an evaluation value calculator 6183 and a reference value memory 6191. The reference value memory 6191 stores information indicating a reference voltage value for the voltage outputted by the power sources PA6 and PB6. The reference value memory 6191 also stores information indicating a difference threshold for the absolute value of a voltage difference between the value of the input voltage inputted to the power converter 6002 and detected by a voltage detector 6015 and the reference voltage value. The evaluation value calculator 6183 calculates an evaluation value by obtaining the absolute value of a voltage difference between the reference voltage value and the voltage value of the input voltage to the power converter 2. When the determiner 185 determines that the waveform of the input voltage is abnormal during the first determination period, the instruction circuit 2181 outputs an open command signal to the mechanical relays 111A and 121A to open the closed mechanical relays 111A and 121A. After the instruction circuit 181 outputs the open command signal, when it is determined that the waveform of the input voltage is normal during the second determination period, the instruction circuit 181 outputs a close command signal to the mechanical relays 111A and 121A to close the mechanical relays 111A and 121A, which have received the open command signal. After the instruction circuit 2181 outputs the open command signal, when the determiner 185 determines that the waveform of the input voltage is abnormal during the second determination period, the instruction circuit 2181 refrains from outputting a close command signal to the mechanical relays 111A, 121A, and 131A, to which the close command signal is supposed to be outputted. The instruction circuit 2181 subsequently outputs an OFF command signal to the semiconductor switches 112A and 122A to drive the semiconductor switches 112A and 122A into the OFF state.

This configuration can reduce the time required to change the power source of the power converter 6002 from the power source PA6 to the power source PB6 with the power supply system configured to step up or down DC power received from the power source PA6 or PB6 as a DC power source and supply the DC power to the load LZ.

The present preferred embodiment has described an example in which the controller 18 determines that the waveform of the input voltage is abnormal when the determined abnormality count of the first determination period, which indicates how many times the evaluation value calculated based on the input voltage to the power converter 2 is consecutively determined to be outside the reference range during the first determination period, is equal to or greater than the first determined abnormality count threshold. However, this should not be construed in a limiting sense. The controller 18 may determine that the waveform of the input voltage is abnormal during the first determination period when, for example, the ratio of the period for which the evaluation value calculated based on the input voltage to the power converter 2 is outside the reference range during the first determination period is equal to or longer than a preset reference ratio.

The present preferred embodiment has described a configuration in which when the waveform of the input voltage is determined to be abnormal in the pre-determination operation, the controller 18 determines whether the waveform of the input voltage is abnormal during the first determination period. However, this should not be construed in a limiting sense. The controller 18 may, for example, store records of past instantaneous values of the input voltage to the power converter 2 and determine whether the waveform of the input voltage is abnormal during a period between the time before the present time by the first determination period and the present time. In the case in which the controller 18 determines that the waveform of the input voltage is abnormal during the first determination period before the present time, when the second determination period elapses since the time before the present time by the first determination period, the controller 18 may determine whether the waveform of the input voltage is abnormal during the second determination period.

This configuration eliminates the need for the pre-determination operation performed by the controller 18. As a result, the switching control operation can be simplified, thus providing an advantage of reducing loads on the controller 18 for processing.

The present preferred embodiment has described a configuration in which the switching module 1 includes the semiconductor switches 112A, 122A, 132A, 112B, 122B, and 132B, but the switching module 1 does not necessarily include the semiconductor switches 112A, 122A, 132A, 112B, 122B, and 132B. For example, the switching module 1 described in the present preferred embodiment may have a configuration without the semiconductor switches 112A, 122A, 132A, 112B, 122B, and 132B.

The present preferred embodiment has described a case in which the power converter 2 is coupled after the switching module 1. However, this should not be construed in a limiting sense, and another circuit may be coupled.

The above has described the present preferred embodiment and modifications of the present invention, but the present invention is not limited to the preferred embodiment and modifications. The present invention embodies appropriate combinations of preferred embodiments and modifications, and appropriate changes of the combinations.

Preferred embodiments of the present invention and modifications thereof are applicable to power supply systems for servers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching module to output to a subsequent circuit electric power supplied from one of a plurality of power sources, the switching module comprising:
   a plurality of mechanical relays coupled between the plurality of power sources and the subsequent circuit;
   a plurality of semiconductor switches respectively coupled in parallel with the plurality of mechanical relays;
   a voltage detector to detect an input voltage to the subsequent circuit; and
   a controller configured or programmed to control connection and disconnection of the plurality of mechanical relays to electrically couple one of the plurality of power sources to the subsequent circuit; wherein
   the controller is configured or programmed to:
      when determining that the input voltage is abnormal during a preset first determination period, output an open command signal to open a closed mechanical relay of the plurality of mechanical relays to the closed mechanical relay, and to control, of the plurality of semiconductor switches, a semiconductor switch coupled in parallel with the mechanical relay receiving the open command signal to drive the semiconductor switch into an ON state, after the first determination period elapses;
      when determining that the input voltage is normal during a preset second determination period longer than the first determination period, output a close command signal to close the mechanical relay receiving the open command signal to the mechanical relay receiving the open command signal, and to control the semiconductor switch coupled in parallel with the mechanical relay receiving the open command signal to drive the semiconductor switch into an ON state; and
      when determining that the input voltage is abnormal during the second determination period, control the semiconductor switch coupled in parallel with the mechanical relay receiving the open command signal to drive the semiconductor switch into an OFF state, and subsequently output the close command signal to an open mechanical relay different from the mechanical relay receiving the open command signal of the plurality of mechanical relays.

2. The switching module according to claim 1, wherein the controller is configured or programmed to:
   every time a preset determination time arrives, determine whether the input voltage is abnormal in accordance with an instantaneous value of the input voltage detected by the voltage detector during a third determination period shorter than the first determination period;
   when determining that the input voltage is abnormal during the third determination period, determine whether the input voltage is abnormal during the first determination period; and
   when determining that the input voltage is normal during the third determination period, end determination whether the input voltage is abnormal.

3. The switching module according to claim 1, wherein the controller is configured or programmed to, when an instantaneous value of the input voltage is outside a preset reference range continuously for a preset reference period during the first determination period, determine that the input voltage is abnormal during the first determination period.

4. The switching module according to claim 1, wherein the controller is configured or programmed to, when a condition in which a determination result of the first determination period is different from a determination result of the second determination period is consecutively repeated a predetermined number of times, update the first determination period to a longer period.

5. The switching module according to claim 1, further comprising:
   a temperature detector to detect a temperature of each of the plurality of semiconductor switches; wherein
   the controller is configured or programmed to, when the temperature of at least one of the plurality of semiconductor switches, the temperature being detected by the temperature detector, exceeds a preset reference temperature, extend the first determination period by a preset unit period.

6. The switching module according to claim 2, wherein
   each of the plurality of power sources is a three-phase alternating current power source including three delta-connected AC power sources; and
   the controller is configured or programmed to, in a state in which one of the plurality of power sources is electrically coupled to the subsequent circuit via three power lines, obtain the instantaneous value by calculating, with respect to different pairs of two power lines selected from the three power lines, an effective value of a line voltage between two power lines of each pair.

7. The switching module according to claim 2, wherein
   each of the plurality of power sources is a three-phase alternating current power source including three Y-connected AC power sources; and
   the controller is configured or programmed to, in a state in which one of the plurality of power sources is electrically coupled to the subsequent circuit via three power lines, obtain the instantaneous value by calculating, with respect to different pairs of two power lines selected from the three power lines, an effective value of a line voltage between two power lines of each pair.

8. The switching module according to claim 1, wherein the plurality of mechanical relays includes six mechanical relays.

9. The switching module according to claim 1, wherein the controller includes a microcomputer and a memory.

10. A power supply system comprising:
    a power converter to convert inputted electric power and supply the electric power to a load; and
    a switching module to output to the power converter electric power supplied from one of a plurality of power sources; wherein
    the switching module includes:
       a plurality of mechanical relays coupled between the plurality of power sources and the power converter;
       a plurality of semiconductor switches respectively coupled in parallel with the plurality of mechanical relays;
       a voltage detector configured to detect an input voltage to the power converter; and
       a controller configured to control connection and disconnection of the plurality of mechanical relays to electrically couple one of the plurality of power sources to the power converter, the controller is configured or programmed to:
- when determining that the input voltage is abnormal during a preset first determination period, output an open command signal to opening a closed mechanical relay of the plurality of mechanical relays to the closed mechanical relay, and to control, of the plurality of semiconductor switches, a semiconductor switch coupled in parallel with the mechanical relay receiving the open command signal to drive the semiconductor switch into an ON state;
- after the first determination period elapses, when determining that the input voltage is normal during a preset second determination period longer than the first determination period, output a close command signal to close the mechanical relay receiving the open command signal to the mechanical relay receiving the open command signal, and to control the semiconductor switch coupled in parallel with the mechanical relay receiving the open command signal to drive the semiconductor switch into an ON state; and
- when determining that the input voltage is abnormal during the second determination period, control the semiconductor switch coupled in parallel with the mechanical relay receiving the open command signal to drive the semiconductor switch into an OFF state, and subsequently output the close command signal to an open mechanical relay different from the mechanical relay receiving the open command signal of the plurality of mechanical relays.

11. The power supply system according to claim 10, wherein the controller is configured or programmed to:
- every time a preset determination time arrives, determine whether the input voltage is abnormal in accordance with an instantaneous value of the input voltage detected by the voltage detector during a third determination period shorter than the first determination period;
- when determining that the input voltage is abnormal during the third determination period, determine whether the input voltage is abnormal during the first determination period; and
- when determining that the input voltage is normal during the third determination period, end determination whether the input voltage is abnormal.

12. The power supply system according to claim 10, wherein the controller is configured or programmed to, when an instantaneous value of the input voltage is outside a preset reference range continuously for a preset reference period during the first determination period, determine that the input voltage is abnormal during the first determination period.

13. The power supply system according to claim 10, wherein the controller is configured or programmed to, when a condition in which a determination result of the first determination period is different from a determination result of the second determination period is consecutively repeated a predetermined number of times, update the first determination period to a longer period.

14. The power supply system according to claim 10, further comprising:
- a temperature detector to detect a temperature of each of the plurality of semiconductor switches; wherein
- the controller is configured or programmed to, when the temperature of at least one of the plurality of semiconductor switches, the temperature being detected by the temperature detector, exceeds a preset reference temperature, extend the first determination period by a preset unit period.

15. The power supply system according to claim 11, wherein each of the plurality of power sources is a three-phase alternating current power source including three delta-connected AC power sources; and the controller is configured or programmed to, in a state in which one of the plurality of power sources is electrically coupled to the subsequent circuit via three power lines, obtain the instantaneous value by calculating, with respect to different pairs of two power lines selected from the three power lines, an effective value of a line voltage between two power lines of each pair.

16. The power supply system according to claim 11, wherein each of the plurality of power sources is a three-phase alternating current power source including three Y-connected AC power sources; and the controller is configured or programmed to, in a state in which one of the plurality of power sources is electrically coupled to the subsequent circuit via three power lines, obtain the instantaneous value by calculating, with respect to different pairs of two power lines selected from the three power lines, an effective value of a line voltage between two power lines of each pair.

17. The power supply system according to claim 10, wherein the plurality of mechanical relays includes six mechanical relays.

18. The power supply system according to claim 10, wherein the controller includes a microcomputer and a memory.

* * * * *